United States Patent [19]

Gillick et al.

[11] Patent Number: 4,903,305

[45] Date of Patent: Feb. 20, 1990

[54] METHOD FOR REPRESENTING WORD MODELS FOR USE IN SPEECH RECOGNITION

[75] Inventors: Laurence Gillick, Brookline; Dean Sturtevant, Watertown; Robert S. Roth, Brighton; James K. Baker; Janet M. Baker, both of West Newton, all of Mass.

[73] Assignee: Dragon Systems, Inc., Newton, Mass.

[21] Appl. No.: 328,738

[22] Filed: Mar. 23, 1989

Related U.S. Application Data

[63] Continuation of Ser. No. 862,275, May 12, 1986, abandoned.

[51] Int. Cl.[4] ............................................. G10L 9/06
[52] U.S. Cl. ......................................... 381/41; 381/43
[58] Field of Search .............................. 364/513.5, 513; 381/41–43

[56] References Cited

U.S. PATENT DOCUMENTS 4,590,605 5/1986 Hataoka et al. ..................... 381/43

OTHER PUBLICATIONS

Wilpon et al, "A Modified K–Means Clustering Algorithm for Use in Isolated Word Recognition", IEEE Trans. on ASSP, vol. ASSP–33, No. 3, Jun. 1985.
Jelinek, "Continuous Speech Recognition by Statistical Methods", Proc. of IEEE, vol. 64, No. 4, Apr. 1976.
Bourlard et al, "Speaker Dependent Connected Speech Recognition Via Phonemic Markov Models", ICASSP 85 IEEE, vol. 3 of 4, pp. 1213–1216, Mar. 1985.
James K. Baker, "Stochastic Modeling for Automatic Speech Understanding", an article from *Speech Recognition*, edited by D. R. Reddy and published by Academic Press, N.Y.C., in 1972.
Janet M. Baker, "Automatic Prototype Selection for Continuous Speech Recognition", an article published in the collection of papers presented at the 97th Meeting of the Accoustical Society of America.
Janet M. Baker, "Performance Statistics of the Hear Acoustic Processor", 1979 IEEE Int. Conf. on Acoustics, Speech & Signal Processing, 79CH1379-7 ASSP, p. 262.
Burton et al., "Isolated–Word Speech Recognition Using Multisection Vector Quantization Codebooks", IEEE Transactions on Acoustics, Speech, and Signal Processing, vol. ASSP–33, No. 4, Aug. '85, p. 837.
Kopec et al., "Network–Based Isolated Digit Recognition Using Vector Quantization", IEEE Transactions on Acoustics, Speech, and Signal Processing, vol. ASSP–33, No. 4, Aug. '85, p. 850.

*Primary Examiner*—Gary V. Harkcom
*Assistant Examiner*—David D. Knepper
*Attorney, Agent, or Firm*—Edward W. Porter

[57] ABSTRACT

A method is provided for deriving acoustic word representations for use in speech recognition. Initial word models are created, each formed of a sequence of acoustic sub-models. The acoustic sub-models from a plurality of word models are clustered, so as to group acoustically similar sub-models from different words, using, for example, the Kullback-Leibler information as a metric of similarity. Then each word is represented by cluster spelling representing the clusters into which its acoustic sub-models were placed by the clustering. Speech recognition is performed by comparing sequences of frames from speech to be recognized against sequences of acoustic models associated with the clusters of the cluster spelling of individual word models. The invention also provides a method for deriving a word representation which involves receiving a first set of frame sequences for a word, using dynamic programming to derive a corresponding initial sequence of probabilistic acoustic sub-models for the word independently of any previously derived acoustic model particular to the word, using dynamic programming to time align each of a second set of frame sequences for the word into a succession of new sub-sequences corresponding to the initial sequence of models, and using these new sub-sequences to calculate new probabilistic sub-models.

34 Claims, 19 Drawing Sheets

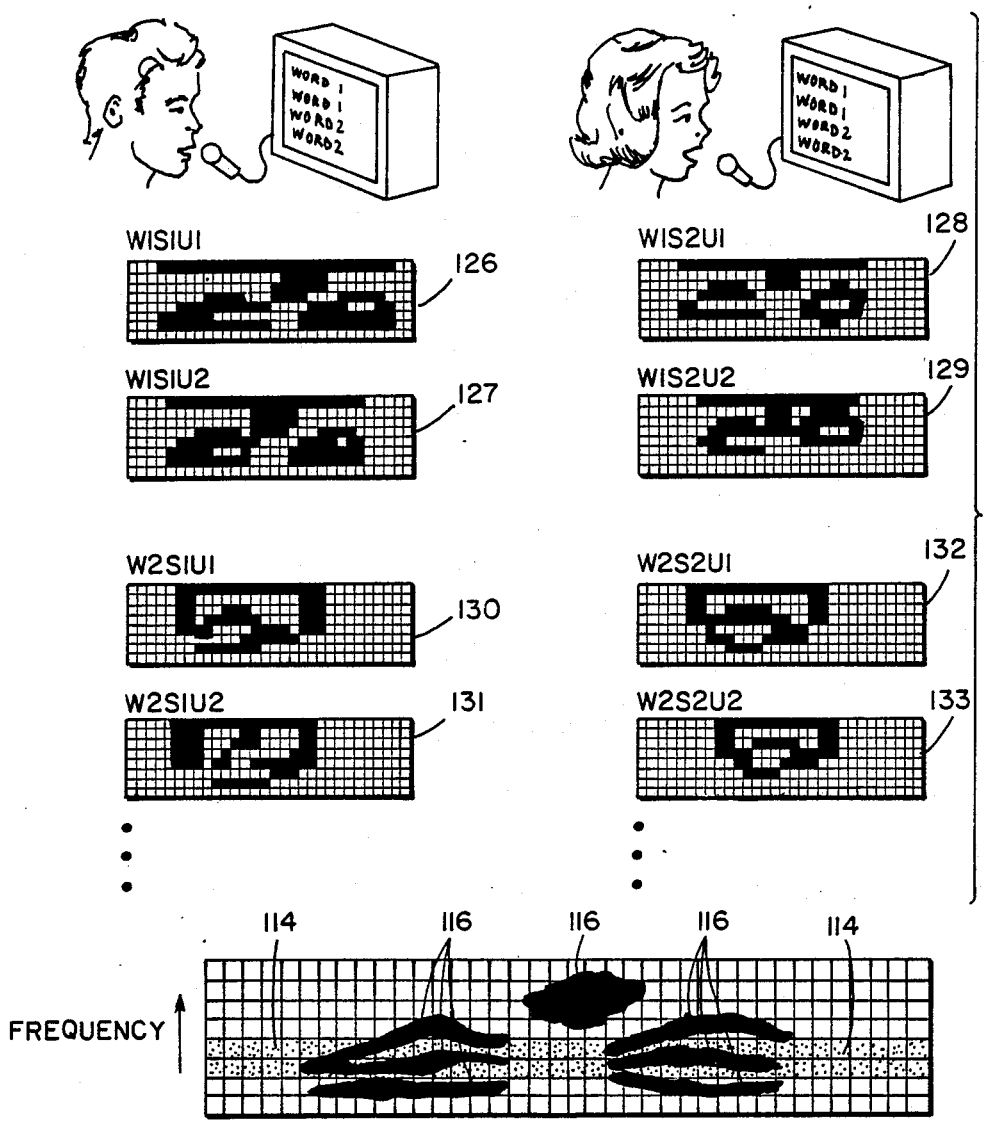
FIG. 2
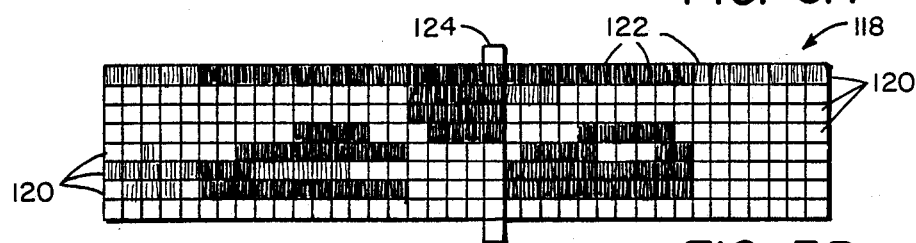
FIG. 3A
FIG. 3B
PRIOR ART

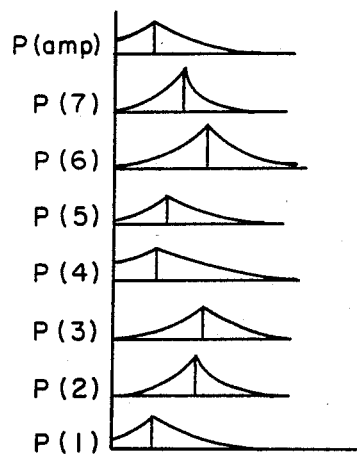
FIG. 6
PRIOR ART
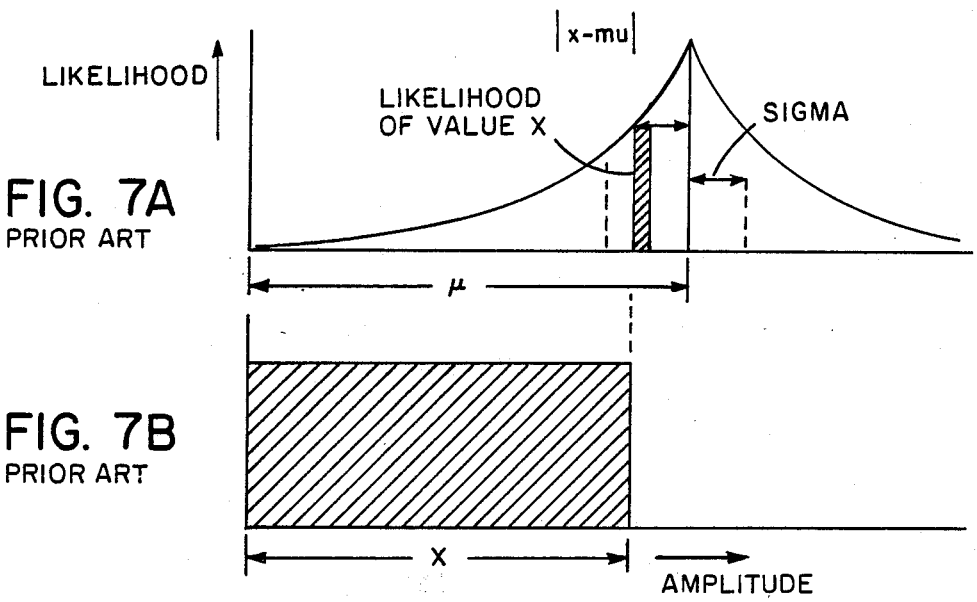
FIG. 7A
PRIOR ART
FIG. 7B
PRIOR ART

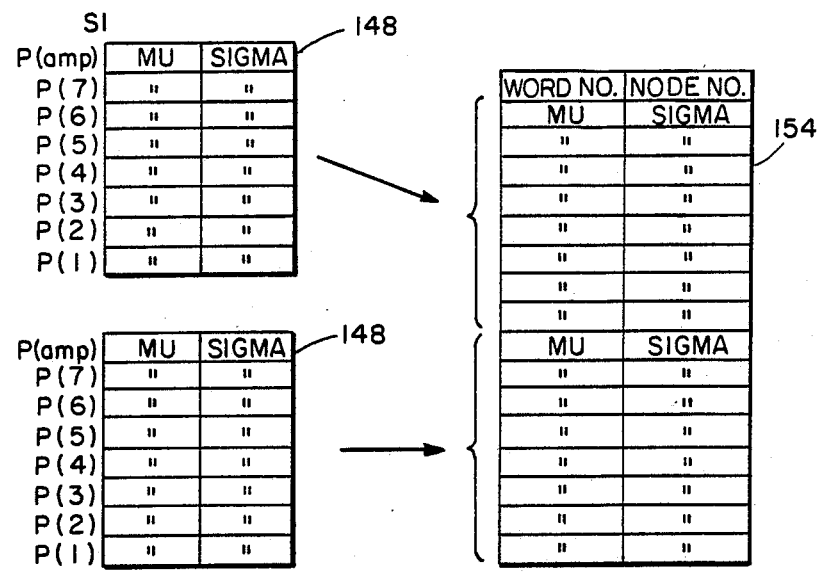
FIG. 10
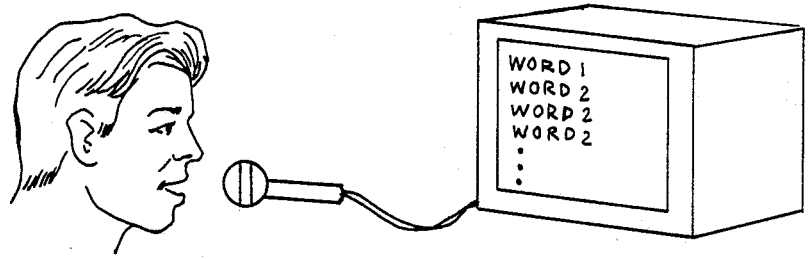
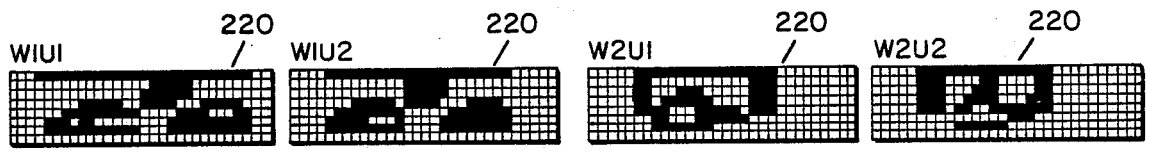
FIG. 17
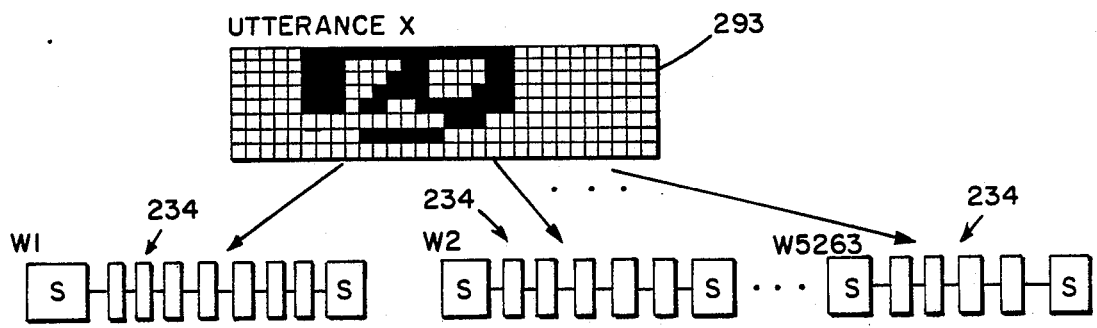
FIG. 19

- REPEAT TEN TIMES  156
  - FOR EACH SUCCESSIVE NODE  158
    - SET CLOSEST CLUSTER DISTANCE = NUMBER LARGER THAN THRESHOLD  162, 164
    - FOR EACH PRESENTLY EXISTING CLUSTER
      - IF THE CURRENT NODE IS ONLY NODE IN CLUSTER, SKIP TO NEXT CLUSTER  166
      - CALCULATE CURRENT_CLUSTER DISTANCE, I.E. DISTANCE FROM NODE TO CLUSTER  168
      - IF CURRENT_CLUSTER_DISTANCE IS LESS THAN CLOSEST_CLUSTER_DISTANCE  174  172
        - SET CLOSEST_CLUSTER_DISTANCE = CURRENT_CLUSTER_DISTANCE
        - SET CLOSEST_CLUSTER = CURRENT CLUSTER  176
    - IF CLOSEST_CLUSTER_DISTANCE IS LESS THAN THRESHOLD, AND IF NODE IS NOT ALREADY IN CLOSEST CLUSTER  178
      - IF NODE IS PRESENTLY IN ANOTHER CLUSTER  180
        - REMOVE IT FROM PREVIOUS CLUSTER  182
        - RECALCULATE MODEL OF CLOSEST_CLUSTER TO REFLECT NODE'S WITHDRAWAL  184
      - PLACE NODE IN CLOSEST CLUSTER  186
      - RECALCULATE MODEL OF CLOSEST_CLUSTER TO REFLECT NODE'S ADDITION  188
    - IF CLOSEST_CLUSTER_DISTANCE IS GREATER THAN THRESHOLD  190
      - IF NODE WAS PREVIOUSLY IN A CLUSTER  192
        - REMOVE IT FROM PREVIOUS CLUSTER  194
        - RECALCULATE MODEL FOR PREVIOUS CLUSTER TO REFLECT NODE'S WITHDRAWAL  196
      - PLACE NODE IN ITS OWN CLUSTER AND SET THAT CLUSTER'S MODEL EQUAL TO THE NODE'S MODEL  198

FIG. 12

METHOD FOR REPRESENTING WORD MODELS FOR USE IN SPEECH RECOGNITION

FIELD OF THE INVENTION

The present invention relates to methods for representing word models for use in speech recognition systems, and more particularly to methods for deriving and storing acoustic representations, or models, of words against which speech sounds can be compared for the purpose of determining the words to which those sounds correspond.

BACKGROUND OF THE INVENTION

There has long been a desire to have machines capable of responding to human speech, such as machines capable of obeying human commands and transcribing human dictation. Such machines would make it much easier for humans to communicate with computers, as well as to record and organize their own thoughts.

Due to recent advances in computer technology and recent advances in the development of algorithms for the recognition of speech, speech recognition machines have begun to appear in the past several decades, and have begun to become increasingly more powerful and increasingly less expensive. For example, the assignee of the present application has previously marketed speech recognition software which runs on popular personal computers and which requires little extra hardware except for an inexpensive microphone, an analog to digital converter, a preamplifier and a relatively inexpensive microprocessor to perform simple signal processing. This system is capable of providing speaker dependent, discrete word recognition for vocabularies of up to 64 words at any one time. An even more advanced form of dictation system is described in U.S. patent application Ser. No. 797,249, entitled "Speech Recognition Apparatus And Method", filed November 12, 1985 by James K. Baker et al, the assignee of which is the assignee of the present application. This U.S. patent application Ser. No. 797,249, which is incorporated herein by reference, discloses a speech recognition system of a type capable of recognizing vocabularies of many thousands of words.

Most present speech recognition systems operates by matching an acoustic description, or model, of a word in their vocabulary against a representation of the acoustic signal generated by the utterance of the word to be recognized. In many such systems, the acoustic signal generated by the speaking of the word to be recognized is converted by an A/D converter into a digital representation of the successive amplitudes of the audio signal created by the speech. Then, that signal is converted into a frequency domain signal, which consists of a sequence of frames, each of which gives the amplitude of the speech signal in each of a plurality of frequency bands over a brief interval of time. Such systems commonly operate by comparing the sequence of frames produced by the utterance to be recognized with a sequence of nodes, or frame models, contained in the acoustic model of each word in their vocabulary.

Originally, the performance of such frame matching systems was relatively poor, since the individual sounds which make up a given word are seldom, if ever, spoken at exactly the same rate or in exactly the same manner in any two utterances of that word. Fortunately, two major techniques have been developed which greatly improved the performance of such systems. The first is probabilistic matching, which determines the likelihood that a given frame of an utterance corresponds to a given node in an acoustic model of a word. It determines this likelihood not only as a function of how closely the amplitude of the individual frequency bands of the frame match the expected frequencies contained in the given node models, but also as a function of how the deviation between the actual and expected amplitudes in each such frequency band compares to the expected deviations for such values. Such probabilistic matching gives a recognition system a much greater ability to deal with the variations in speech sounds which occur in different utterances of the same word, and a much greater ability to deal with the noise which is commonly present during speech recognition tasks.

The second major technique which greatly improves the performance of such frame matching systems is that of dynamic programming. Stated simply, dynamic programming provides a method to find an optimal, or near optimal, match between the sequence of frames produced by an utterance and the sequence of nodes contained in the model of a word. It does this by effectively expanding and contracting the duration of each node in the acoustic model of a word to compensate for the natural variations in the duration of speech sounds which occur in different utterances of the same word. A more detailed discussion of the application of dynamic programming to speech recognition is available in J. K. Baker's article entitled "Stochastic Modeling for Automatic Speech Recognition" in the book *Speech Recognition*, edited by D. R. Reddy and published by Academic Press, New York, New York in 1975.

The performance of present speech recognition systems is impressive when compared to similar systems of a short time ago. Nevertheless, there is still a need for further improvement. For example, in order for a speech recognition system to be of practical use for many tasks, it needs to be able to recognize a large vocabulary of words. Unfortunately, most high performance speech recognition systems require that a given user speak each word in the system's vocabulary a plurality of times before the system can reliably rocognize the speaking of that word by the given user. This enables the system to develop a relatively reliable model of how the user speaks each such word. Most of the speech recognition systems made to date have had small vocabularies and thus this requirement of speaking each vocabulary word several times has been relatively acceptable burden. But in large vocabulary systems it becomes a very large burden. For example, in a system with 50,000 words in which the user is required to say each word five times, the user would be required to say 250,000 utterances in order to train the system. This would require saying one word every second, without interruption, for more than eight successive eight-hour work days. Clearly, the requirement of such training will discourage the use of large vocabulary systems unless a much simpler method for enrolling new users can be developed.

Another desirable goal involving large vocabulary systems is that of deriving more efficient means for representing the acoustic models associated with each of its words. Although the drop in the price and size of memory has somewhat reduced the need for deriving more efficient acoustic word representations, it certainly has not eliminated the desirability of more compact representations. For example, the acoustic representation technique described in the above mentioned U.S. patent application Ser. No. 797,249 requires at least 16 bytes for each node of each word. Since words typically involve five to ten nodes, that means that each word requires somewhere in the vicinity of 80 to 160 bytes to represent its acoustic model. At this rate, a fifty thousand word vocabulary would probably require more than five megabytes of memory. Thus it can be seen that it would be desirable to find a more efficient technique of storing acoustic word models.

SUMMARY OF THE INVENTION

It is an object of the present invention to provide a method suitable for training speech recognition systems to recognize words spoken by a given user, which method is relatively quick and easy for the user to use, and which enables the system to recognize words spoken by the given user with relative reliability.

More particularly, it is a further object of the present invention to provide a method for providing an acoustic representation of each word in a large vocabulary of words, which method is relatively efficient in terms of the amount of memory required to store the acoustic representations for all such words.

Furthermore, it is an object of the present invention to provide such a method which enables the user to train a system to recognize his utterance of any one of a large vocabulary of words without requiring the user to speak each such word in advance.

It is yet another object of the present invention to provide a method for dividing multiple utterances of the same word, either by the same or different speakers, into corresponding acoustic units.

More particularly, it is also an object of the present invention to provide such a method which is capable of finding corresponding acoustic units occurring in utterances of the same word spoken by different speakers to enable acoustic models of those units and of words in which they occur to be constructed from utterances of different speakers.

Furthermore, it is an object of the present invention to provide such a method which is capable of accurately finding similar acoustic units occurring in different words, so as to enable a common acoustic model for such similar acoustic units to be made.

According to one aspect of the invention, a method of deriving an acoustic word representation for use in a speech recognition system is provided. This method comprises receiving one or more sequence of acoustic frames for each of a plurality of words, each of which frames has a corresponding set of n parameter values. The method further includes using dynamic programming to derive from each frame sequence associated with each such word a corresponding sequence of dynamic programming elements (hereinafter referred to as dp elements). This dynamic programming includes creating a sequence of dp elements, having an n-dimensional probability distribution, for each word. It uses one or more iterations to seek a relatively optimal match between the successive probability distributions of the sequence of dp elements for a given word and the successive parameter values of the one or more frame sequences associated with that word. This divides each frame sequences associated with a given word into a plurality of sub-sequences, each associated with one dp element. Each dynamic programming iteration involves calculating a new n-dimensional probability distribution for individual dp elements, each dimension of a given dp element's distribution being calculated as a function of corresponding parameter values from frames matched with the given dp element by the iteration.

The method of deriving an acoustic word representation further includes clustering the dp elements produced by the dynamic programming for each of the plurality of words into a plurality of clusters. This process of clustering includes placing individual dp elements into the cluster of such elements which has a probability distribution closest to that element's own probability distribution, as determined by a certain statistical metric. The clustering also includes calculating an n-dimensional probability distribution for each cluster which is derived from the corresponding n-dimensional probability distribution of the dp elements placed within it. The method of deriving an acoustic word representation further includes creating a sequence of such clusters to represent a given word, with the successive clusters of each such sequence being the clusters associated with the corresponding successive dp elements produced for the word by the dynamic programming.

In the preferred embodiment of the invention, the method includes receiving a plurality of acoustic frame sequences, each derived from a different utterance, for each of a plurality of words. In this embodiment, the dividing of frame sequences includes dividing each of the frame sequences associated with a given word into a corresponding plurality of sub-sequences, and the calculating of a dp element includes calculating a common dp element for a group of corresponding sub-sequences derived from different utterances of the same word. This common dp element includes an n-dimensional probability distribution, each dimension of which is calculated from one of the n corresponding parameter values of the frame contained within its group of corresponding sub-sequences of frames. The frame sequences associated with each word can be derived from a plurality of speakers.

In the method just described it is also preferred that the clustering of dp elements includes clustering together dp elements derived from the utterances of different words. It is also preferred that the calculating of dp elements includes calculating a measure of central tendency and a measure of spread for each of the n-dimensions of a given dp element's probability distribution, and that the calculating of an n dimensional probability distribution for each cluster includes calculating a measure of central tendency and a measure of spread for each of the n dimensions of the cluster's probability distribution. Preferably, the clustering is performed by use of the Kullback-Leibler metric or a metric which is similar to it in form. It is desirable that both the dynamic programming process and the clustering process each be performed iteratively.

In certain embodiments of the invention hierarchical clustering is used. In such hierarchical clustering the dp elements are first divided into a relatively small number of first-level clusters and then the dp elements within each first-level cluster are clustered so as to derive subclusters. These first-level clusters can be made to correspond to phonemes.

According to an alternative aspect of the invention, a method of deriving an acoustic word representation for use in speech recognition systems is provided. This method involves receiving a first set of frame sequences generated by one or more utterances of a given word, and then using dynamic programming to derive a corresponding initial sequence of probability distribution models. The method then uses dynamic programming to time align each of a second set of frame sequences of the given word against this initial sequence of probability distribution models. This divides each of the second set of frame sequences into a corresponding plurality of new sub-sequences, with each of the new sub-sequences being associated with one of the probability distribution models of the initial sequence. The method further involves calculating a dp programming element for each group of corresponding new sub-sequences.

According to a preferred embodiment of this method, dynamic programming time aligns frame sequences from the different speakers against the initial sequence of probability distribution models, so that frame sequences from different speakers are divided into corresponding new sub-sequences. The calculating of a dp element for each group of corresponding new sub-sequences includes calculating a separate such dp element from the corresponding new sub-sequences of each speaker. The resulting dp elements from different speakers which correspond to the same part of a given word are grouped together to form a parallel dp element. These parallel dp elements are then clustered into a plurality of multi-speaker clusters.

Preferably, a multi-speaker acoustic model is formed from each multi-speaker cluster. An acoustic representation of a word is then formed by taking the initial sequence of probability distribution models for the word and replacing each of the probability distribution models in that sequence with the multi-speaker model of the cluster in which the probability distribution model's corresponding parallel dp element was placed. It is also preferred that the initial sequence of probability distribution models be derived from multiple utterances of each word spoken by each of a plurality of different speakers.

According to yet another aspect of the present invention, a method is provided for recognizing which word, from among a plurality of words, a given utterance corresponds to. This method includes receiving a sequence of acoustic frames generated by the utterance of a given word, each of which frames has n parameter values. The method further includes storing an alphabet of sound symbols, each of which has associated with it an n-dimensional probability distribution corresponding to the n parameter values associated with each frame. The method includes storing an acoustic spelling for each of the plurality of words, with each of the spelling representing a sequence of one or more such sound symbols, and with such sound symbols being used in the spelling of more than one word. The method also includes comparing the parameter values of a frame sequence against the probability distributions associated with the acoustic spelling of each of a plurality of words, to determine what word the frame sequence corresponds to.

According to a preferred embodiment, this method further includes training a speech recognition system to recognize words spoken by a given user. This training includes receiving a sequence of training frames produced by having the user speak a script of training words having a known sound symbol spelling. The training further includes dividing the training frame sequence into a plurality of sub-sequences, with each sub-sequence being associated with one of the sound symbols contained in the spelling of the training words. Once this is done, an n-dimensional probability distribution is calculated for each sound symbol from the parameter values of the frames of all sub-sequences associated with that sound symbol. The resulting probability distribution are used to acoustically define each sound symbol.

Preferably, this method includes storing an n-dimensional multi-speaker probability distribution for each sound symbol prior to training by the user. The training frame sequence produced by the user is time aligned by dynamic programming against the sequence of such multi-speaker probability distributions associated with the acoustic spelling of the training script. The training script should include substantially fewer words than the system's vocabulary, but it should include substantially all the sound system stored in the alphabet of sound symbols.

DESCRIPTION OF THE DRAWINGS

These and other aspects of the present invention will become more clear upon reading the following description of the preferred embodiment in conjunction with the accompanying drawings, in which:

FIG. 2 is a schematic representation of each of a plurality of speakers speaking multiple utterance of each of a plurality of words;

FIG. 3A is a schematic representation of a spectrogram of the utterance of a word, and FIG. 3B illustrates what such an utterance looks like once it has been converted into a sequence of eight-parameter frames;

FIG. 6 is a graphic representation of an n-dimensional probability distribution of the type formed by the process shown in FIG. 5;

FIG. 7A is a more detailed view of one dimension of the probability distribution shown in FIG. 6, and FIG. 7B is a graphic representation of a frame parameter value shown for comparison with the probability distribution of FIG. 7A;

FIG. 10 is a schematic representation of the process by which parallel node models are formed from single-speaker node models produced in the process of FIG. 9;

FIG. 12 is a schematic block diagram illustrating the steps used to perform the clustering illustrated schematically in FIG. 11;

FIG. 17 is a schematic representation of a user training the speech recognition system of the present invention to recognize his words by speaking a plurality of training utterances dictated by a training script;

FIG. 19 is a schematic representation of how a user's utterance which is to be recognized is compared against a plurality of acoustic word models of the type produced in FIG. 18 to determine the word to which the utterance corresponds.

DETAILED DESCRIPTION OF PREFERRED EMBODIMENTS OF THE INVENTION

Figure 1:
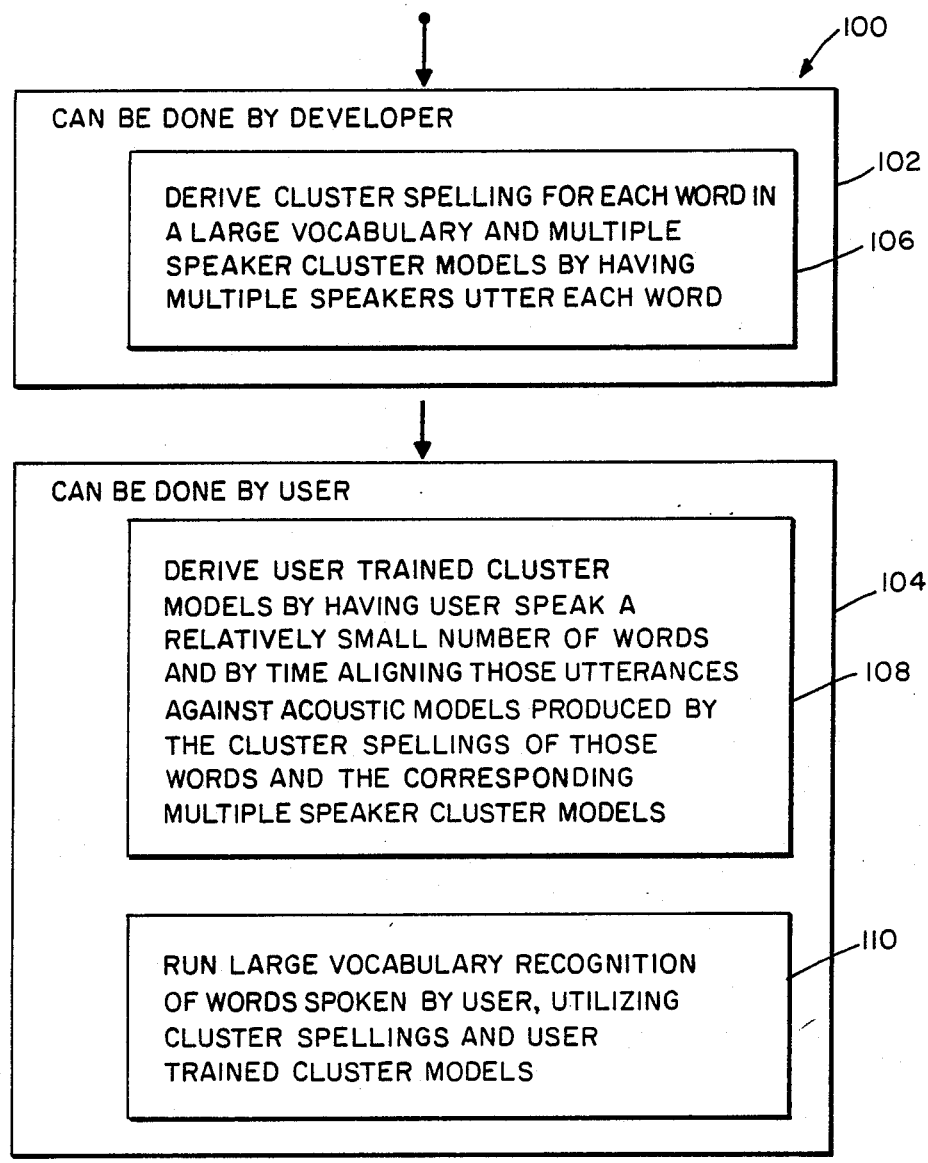
FIG. 1 is a schematic block diagram describing how the present invention involves deriving acoustic representations, training them to a given speaker's voice, and then using them to recognize words spoken by the user.

Referring now to FIG. 1, the present invention enables a user to train and use a large-vocabulary, speaker-dependent, speech recognition system, without the need to separately train each word the system is capable of recognizing. The method of doing this can be divided into two major portions, as is indicated in FIG. 1. A first portion 102 includes steps which can be performed by the developer of the speech recognition system, and a second portion 104 includes steps to be performed by the individual user.

The first portion 102 includes the steps of block 106. These include deriving a cluster spelling for each word the system is to be capable of recognizing, and deriving a multiple speaker acoustic model for each cluster used in such cluster spellings. Both the cluster spellings and the multi-speaker cluster models are made by having multiple speakers speak each word in the system's vocabulary multiple times. In a large vocabulary system this is quite an undertaking. For this reason, these steps will normally be performed by the developer of the speech recognition system.

The second portion 104 of the method shown in FIG. 1, includes steps to be performed by each individual user of the speech recognition system. Once the user receives a system containing the cluster spellings and multi-speaker cluster models derived by the developer in steps 106, the user must train the system to respond to his voice as indicated in block 108. Thanks to the present invention, he does not need to speak each word in the system's vocabulary. Instead, the present invention only requires him to speak enough training words to enable the system to derive a user trained acoustic model for each of the clusters used in its cluster spellings. This is done by time aligning each utterance of a training word against a multi-speaker acoustic model of that word. Such multi-speaker word models are derived by stringing together the multi-speaker cluster models associated with the cluster spelling for a given word.

Once a user-trained cluster model has been derived for each cluster used in the system's cluster spellings, the user can then have the system recognize his utterance of any word in the system's vocabulary, as is indicated in box 110. The system does this by comparing the utterance to be recognized against user-trained acoustic models of the words in its vocabularies. These user-trained word models are derived by stringing together the user-trained cluster models associated with the cluster spelling of each word.

Referring now to FIGS. 2–17, a more detailed description of the process described in block 106 of FIG. 1 will be described.

As FIG. 2 illustrates, the preferred embodiment of the invention involves having each of a plurality of speakers speak each of a plurality of words a multiple number of times. FIG. 2 shows two such speakers, but preferably a larger number, such as 10 or 20 different speakers, are used. It is also preferred that the different speakers include both men and women and speakers who speak the language for which the system is being trained with different dialects and accents. Although FIG. 2 specifically shows each speaker saying two utterances of each word, it is to be understood that it is preferable for a large number of utterances, such as five or ten, to be spoken by each speaker for each word. It should also be understood that this speaking of a word by multiple speakers is repeated for each word in the vocabulary that the system is ultimately to be capable of recognizing. In the preferred embodiment, it is expected that such a vocabulary will include substantially more than a thousand words and preferably substantially more than 10,000 words.

As is illustrated in FIG. 3A, each of the utterances spoken for a given word by a given speaker can be represented by a spectrogram which plots frequency of sound along the vertical axis and time along the horizontal axis. In this plot the amplitude of sound energy at a given frequency and time is indicated by the darkness at the xy coordinate defined by that frequency and time. In this spectrogram the area of darkness 114 represent background noise and the areas of darkness 116 represent the speech sounds associated with the utterance of a word.

Figure 4:
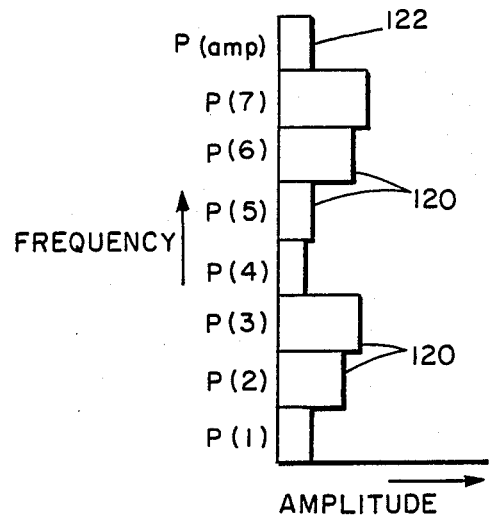
FIG. 4 is a graphical representation of an individual frame taken from the sequence of frames shown in FIG. 3B.

The spectrogram illustrated in FIG. 3A has both high frequency and high temporal resolution. In the preferred embodiment, however, the spectral representations used are of a relatively low resolution. Such low resolution is used both to conserve the memory required to store utterances, and more importantly, to reduce the amount of computation required to process them. As is illustrated in FIG. 3B, in the preferred embodiment, the signal produced by a given utterance is divided into a succession of frames, each of which is 20 milliseconds in length, and each of which has associated with it eight parameter values 120. These eight parameter values are derived by dividing the sound of the utterance occurring during each 20 milliseconds into eight frequency channels. As shown in FIG. 3B the top-most parameter 122 of each frame is given a value which corresponds to the average of the logarithm of the amplitude for each of these eight frequency bands. Each of the other seven parameters of a frame corresponds to the logarithm of one of the lower seven of these eight frequency bands, after that logarithm has been normalized by the average of the eight logarithms stored in the top-most parameter 122. FIG. 4 gives a graphic representation of a set of parameters associated with an individual frame of the sequence 118, such as the frame 124 shown in FIG. 3B.

Methods for deriving frame-based spectral representations of utterances are well known in the art of speech recognition. A more detailed explanation of the particular frame representation used in the preferred embodiment of the present invention is provided in the above mentioned U.S. patent application Ser. No. 797,249.

Figure 5:
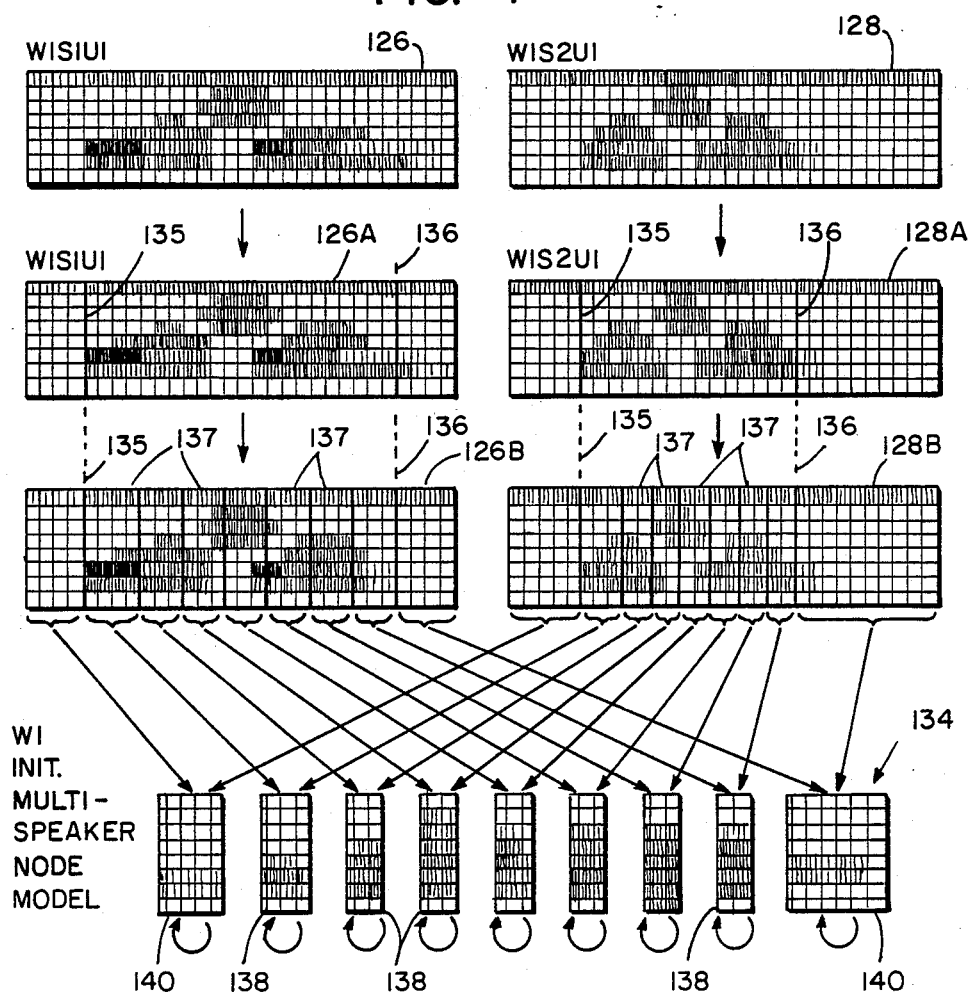
FIG. 5 is a schematic representation of the process by which sequences of frames associated with utterances of a given word by different speakers each have their beginning and end points detected, are linearly segmented into corresponding sub-sequences, and have a probability distribution model calculated for each resulting group of corresponding sub-sequences, which probability distributions are linked together to form an initial multi-speaker word model.

Referring now to FIG. 5, an illustration is made of the process by which a plurality of utterances by different speakers of a given word are used to derive an initial multi-speaker model 134 of that word. In FIG. 5 only two utterances, 126 and 128, are shown for purposes of simplification. Utterance 126 is labeled W1S1U1, which stands for Word 1, Speaker 1, Utterance 1. Utterance 128 is labeled W1S2U1, which stands for Word 1, Speaker 2, Utterance 1. It is preferred, however, that substantially more utterances by each speaker be used to derive the initial multi-speaker word model 134.

In the process shown in FIG. 5, each of the frame sequences associated with the utterance of a given word, such as the utterances 126 and 128 associated with Word 1, is submitted to a process which detects the beginning 135 and the end 136 of speech in that utterance. Methods for detecting the beginning and end of utterances are well known in the art of speech recognition. For example, when words are spoken separately against a background of relative silence, the beginning and end of each word can be detected by noting when sound amplitude first exceeds a threshold level and when it finally drops below that threshold level.

Once each utterance of a given word has had its beginning 135 and end 136 marked, as indicated in the frame sequence 126A and 128A in FIG. 5, the average length, or number of frames, over all such utterances of the given word is determined. This average is then divided by a constant integer, and the result is rounded off to the nearest whole number to produce a segmentation number. Then each of the frame sequences of the given word has the frames located between its word start 135 and word and 136 divided into a number of sub-sequences 137 equal to the segmentation number. If the segmentation number does not divide evenly into the number of frames between an utterance's word start and word end, left-over frames are distributed among its sub-sequences. One suitable method for doing this is by giving each successive sub-sequence 137 into which an utterance is divided one extra frame until all such extra frames have been used up.

Once each of the utterances of a given word have been divided into a succession of corresponding sub-sequences 137, the frames associated with corresponding sub-sequences 137 in different utterances of the word are combined to form initial multi-speaker node models 138. This is done by combining together all of the frames associated with the first sub-sequence in each utterance of a word to form a first node model 138 for that word, then combining together all of the frame associated with the second sub-sequence in each utterance of the word to from a second node model 138 for the word, and so on. Each such node model is formed by calculating for each of the eight parameters of each of its associated frames both an arithmetic average, indicated by the Greek Letter mu, and a measure of spread, such as the absolute deviation, represented by the Greek letter sigma. As a result, each node has an eight dimensional probability distribution of the type illustrated in FIG. 6. Each of the eight dimensions has a Laplacian probability distribution of the type illustrated in greater detail in FIG. 7A. The probability distribution for each of the eight dimensions are treated as statistically independent of each other. Although this assumption is not strictly accurate, it yields acceptable performance and greatly reduces computation requirements.

A probability distribution of the type shown in FIG 7 indicates the likelihood that a given parameter value of a given frame, such as that shown in FIG. 7B, is associated with a node having such a probability distribution. As is described in greater detail in the above mentioned U.S. patent application Ser. No. 797,249, by summing the logarithms of the likelihood that each of the eight parameters of a given frame would match its corresponding dimension of a given node's probability distributions, one can calculate the likelihood that that frame corresponds to that node. The negative of such a likelihood can be used as a cost function in a dynamic programming algorithm which calculates a minimum cost path through a dynamic programming network.

As is shown in FIG. 5, after each of the corresponding groups of sub-sequences 137 from different utterances of a given word have been combined into a corresponding node model 138, the resulting sequence of node models 138 can be strung together to produce a initial multi-speaker model 134 for that word. For purposes of dynamic programming, a silence node model 140 should be added to the beginning and end of the word model 134. Such silence models 140 are derived by calculating a mu and a sigma in a manner similar to that used to calculate node models 138 for each of the eight parameters of frames occurring before the word starts 135 and after the word ends 136. The same silence node model 140 can be used for the beginning and end of all word models 134.

Figure 8:
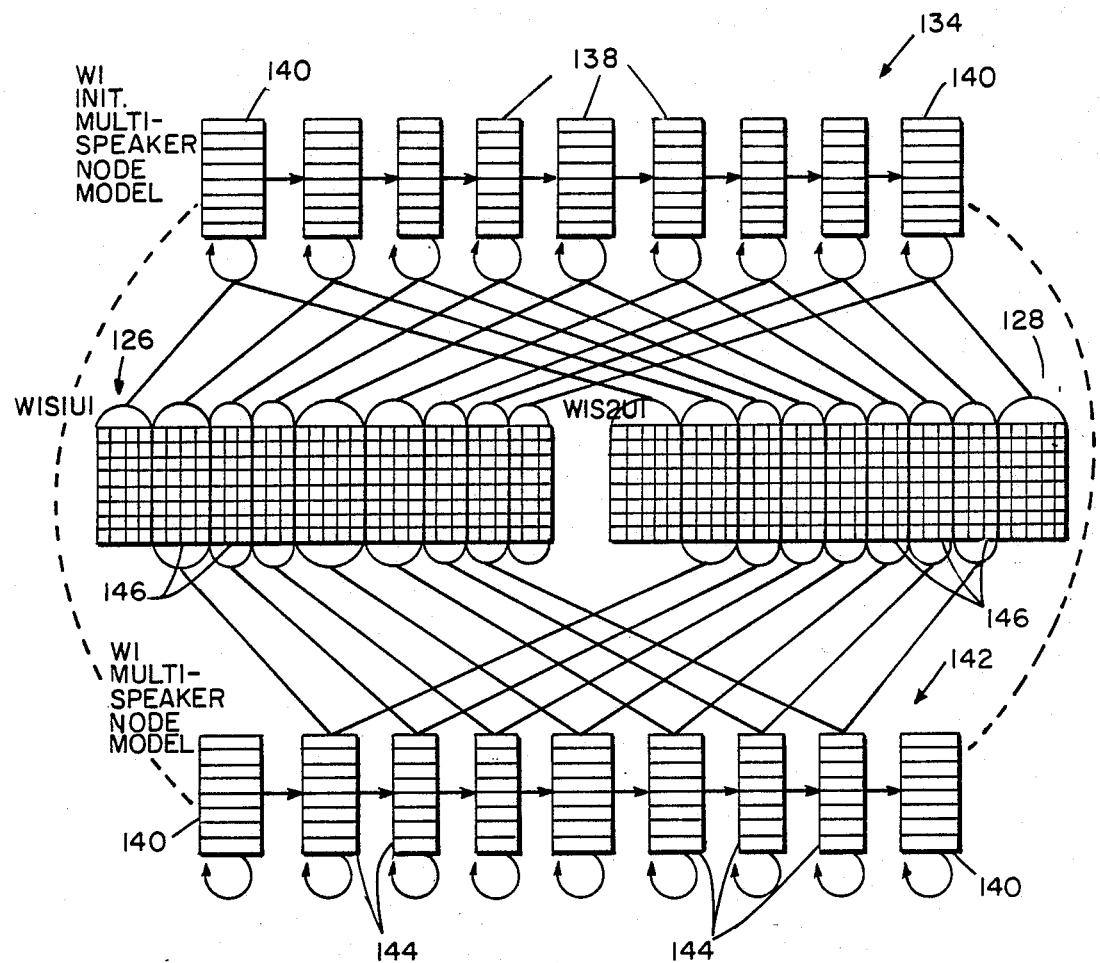
FIG. 8 is a schematic representation of a process in which the word model produced in FIG. 5 is used to resegment the frame sequences of that figure into groups of corresponding new sub-sequences, and in which a new multi-speaker word model is derived by calculating a new probability distribution for each group of corresponding new sub-sequences.

Referring now to FIG. 8, after the initial multi-speaker model 134 for a given word has been derived by the process shown in FIG. 5, dynamic programming is used to resegment the utterances of that word into a corresponding succession of new frame sub-sequences 146. These frames associated with these new sub-sequence are then used to derive a second, more accurate, multi-speaker word model 142.

It is well known that dynamic programming can be used to find the optimal time alignment between a sequence of frames and the sequence of nodes in a word model. More particularly, once given a two dimensional network, such as that formed by multiplying (i.e. taking the Cartesian product of) a word model 134 by the frame sequence of an utterance, and a cost function that measures the similarity between any node and any frame of acoustic data, it is well know to those skilled in the art of dynamic programming how to find the minimum cost path through the network for any sequence of frames, such as the sequences 126 and 128 shown in FIG. 8. Given a set of models for the nodes in a word, the negative logarithm of the likelihood, described above with regard to FIGS. 7A and 7B, and described in greater detail in the above mentioned U.S. patent application Ser. No. 797,249, may be used as the cost function.

Once the minimum cost path has been found, a program may trace that path to find which frames are associated with each node on this minimum cost path. The frames associated with each node 138 are grouped together into a sub-sequence of frames 146. As a result, each of the frame sequences associated with a given word, such as the frame sequences 126 and 128 in FIG. 8, is divided into a corresponding succession of sub-sequences 146. After this has been done, a separate node model 144 is calculated from all the sub-sequences 146 in each utterance of a given word associated with each node 138 in the initial model of that word. The node models 144 have the same form as the initial node models 138 and are calculated in the same manner, that is, by estimating the mu's and sigma's for each of the eight parameters of the frames associated with that node.

The sub-sequences 146 produced by the process shown in FIG. 8 tend to have different boundaries than the sub-sequences 138 formed in FIG. 5. This is because the boundaries of the sub-sequences 146 are determined by dynamic programming which tends to group together frames which correspond to a given initial node model 138, rather than be merely segmenting the frames in a linear fashion as is done in the process of FIG. 5.

Once the multi-speaker node models 144 have been produced and strung together to form a new word model 142, the process of FIG. 8 is repeated, using the new word model 142 in place of the initial word model 134. Each repetition of the process of FIG. 8 time aligns the frames of each utterance of a word against the multi-speaker word model 142 produced in the previous iteration of that process. It then calculates a new node model 144 from all of the frames time aligned with each node in the word model 142. Finally, the process strings together these new mode models to form an even new word model 142. As is well known in the art of dynamic programming, a time alignment and node calculation process, such as that shown in FIG. 8, can be repeated until the process approaches convergence, at which point the boundaries of the sub-segments formed by the process cease to change significantly between successive iterations.

It can be seen that the process of FIG. 8 tends to break the utterances of a given word into a corresponding succession of sub-sequences, in which the frames within each group of corresponding sub-sequences are as similar as possible. Thus the process of FIG. 5 and FIG. 8, when taken together, tends to produce a multi-speaker node model for a given utterance which tends to capture the corresponding speech sounds which occur in multiple utterances of that word.

Figure 9:
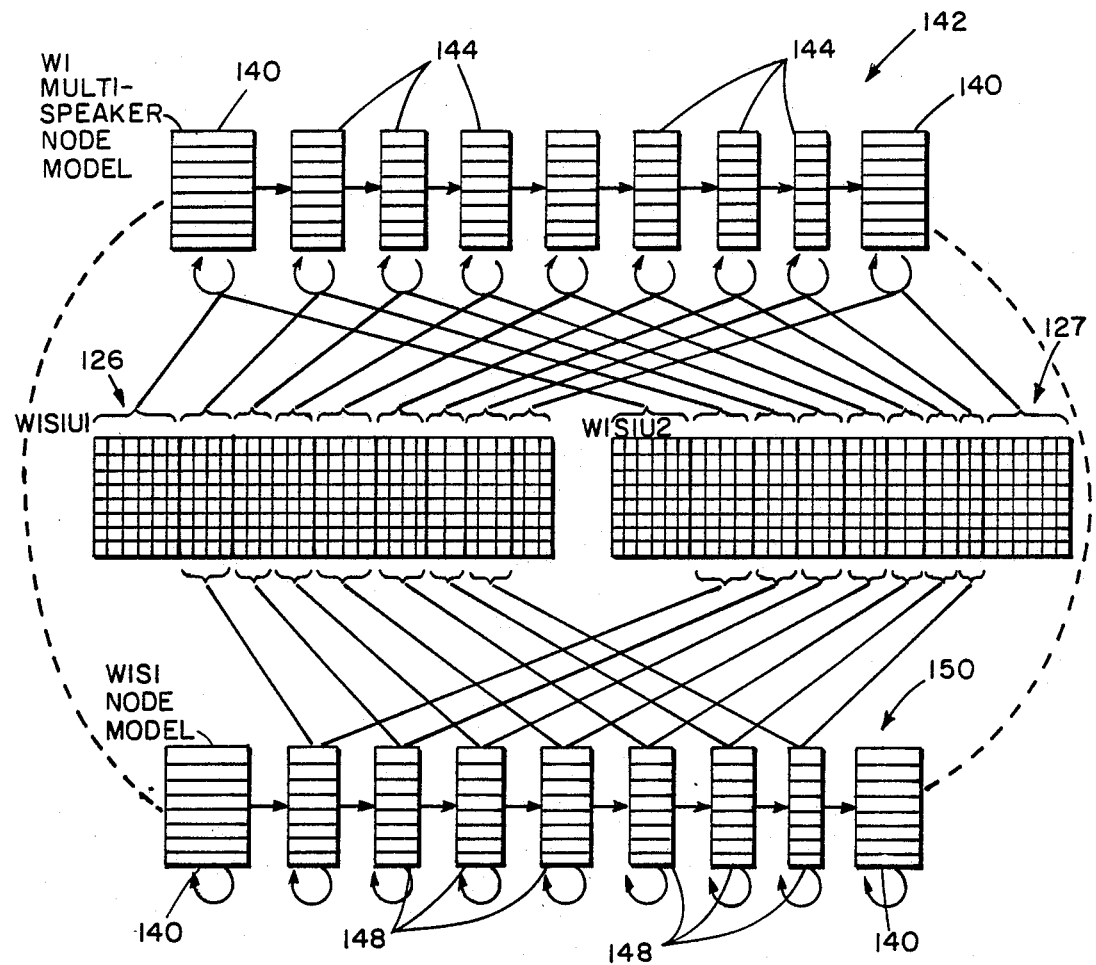
FIG. 9 is a schematic representation of a process similar to that shown in FIG. 8, except that in FIG. 9 utterances by a single speaker are time aligned against the multi-speaker word model derived in FIG. 8, so as to derive single-speaker node and word models.

Referring now to FIG. 9, once a multi-speaker model 142 has been produced for a given word by repeated iterations of the process shown in FIG. 8, the multi-speaker model 142 is used in the process of FIG. 9 to derive a single-speaker model 150 for the same word.

The single-speaker word models 150 are formed by time aligning each utterance of a given word by a given speaker, such as the utterances 126 and 127 shown in FIG. 9, against the multi-speaker node model 142 derived for that word by the process of FIG. 8. The process of FIG. 9 is substantially identical to the process of FIG. 8, except that in FIG. 9 utterances of only one speaker are time aligned against word models derived from a plurality of speakers. Once each of the utterances by the given speaker have been time aligned and segmented, frames from corresponding sub-sequences in different utterances are combined to form single-speaker node models 148. These node models have the same form and are calculated in the same manner as the node models 138 and 144 formed in the processes of FIGS. 5 and 8, respectively. The sequence of node models 148 formed for a given word are then strung together to form a single-speaker word model 150.

In order to obtain optimal segmentation, the process of FIG. 9, like the process of FIG. 8, is iterated until it achieves substantial convergence. This is done by replacing the multi-speaker node model 142 with the single-speaker node model 150 and repeating the process shown in FIG. 9 until there is no substantial change in segmentation between iterations.

The process of FIG. 9 is performed for each speaker and for each word, so that each word in the vocabulary has associated with it a separate singe-speaker word model 150 for each of a plurality of speakers.

Single-speaker word models similar in form to the word models 150 of FIG. 9 could be obtained by dynamic programming without first developing the multi-speaker word models 142. But developing a common multi-speaker word model 142 for each word and then time aligning each speaker's utterances of that word against that common model is essential to the development of the multi-speaker cluster spellings described below in this application. It is essential because it causes the single-speaker word models 150 of a given word produced for different speakers to be divided into a common number of acoustically corresponding nodes, and thus it enables the corresponding sounds in different speaker's models of the same word to be grouped together for purposes of deriving such cluster spellings.

Referring now to FIGS. 10 through 13, once the process described in FIG. 9 has been performed, the single-speaker node models 148 from the model 150 of each word are clustered.

As is shown in FIG. 10, before actual clustering takes place, the corresponding single-speaker node models 148 of different speakers are concatenated to make a parallel node model 154. Thus all the first nodes from different speaker's models 150 of Word 1 are combined to make a first parallel node model 154 for that word, then all the second nodes in models of that word are combined to make a second parallel node model, and so on. This is performed for all words in the vocabulary. For purposes of simplification, FIG. 10 shows this process being performed for only two speakers, S1 and S2. In the preferred embodiment, however, node models from considerably more speakers are used.

As stated above, each single-speaker node model 148 includes an eight dimensional probability distribution, represented by a mu and a sigma for each of eight frame parameters. As a result, the parallel node model 154 produced by concatenating such single-speaker node models 148 from each of m speakers has an 8-by-m dimensional probability distribution. In addition, as is illustrated in FIG. 10, each parallel node model 154 has at its start a header which defines both the word number of the word from which it is derived and the individual node number within that word. The use of these headers is described below with regard to FIG. 14.

Figure 11:
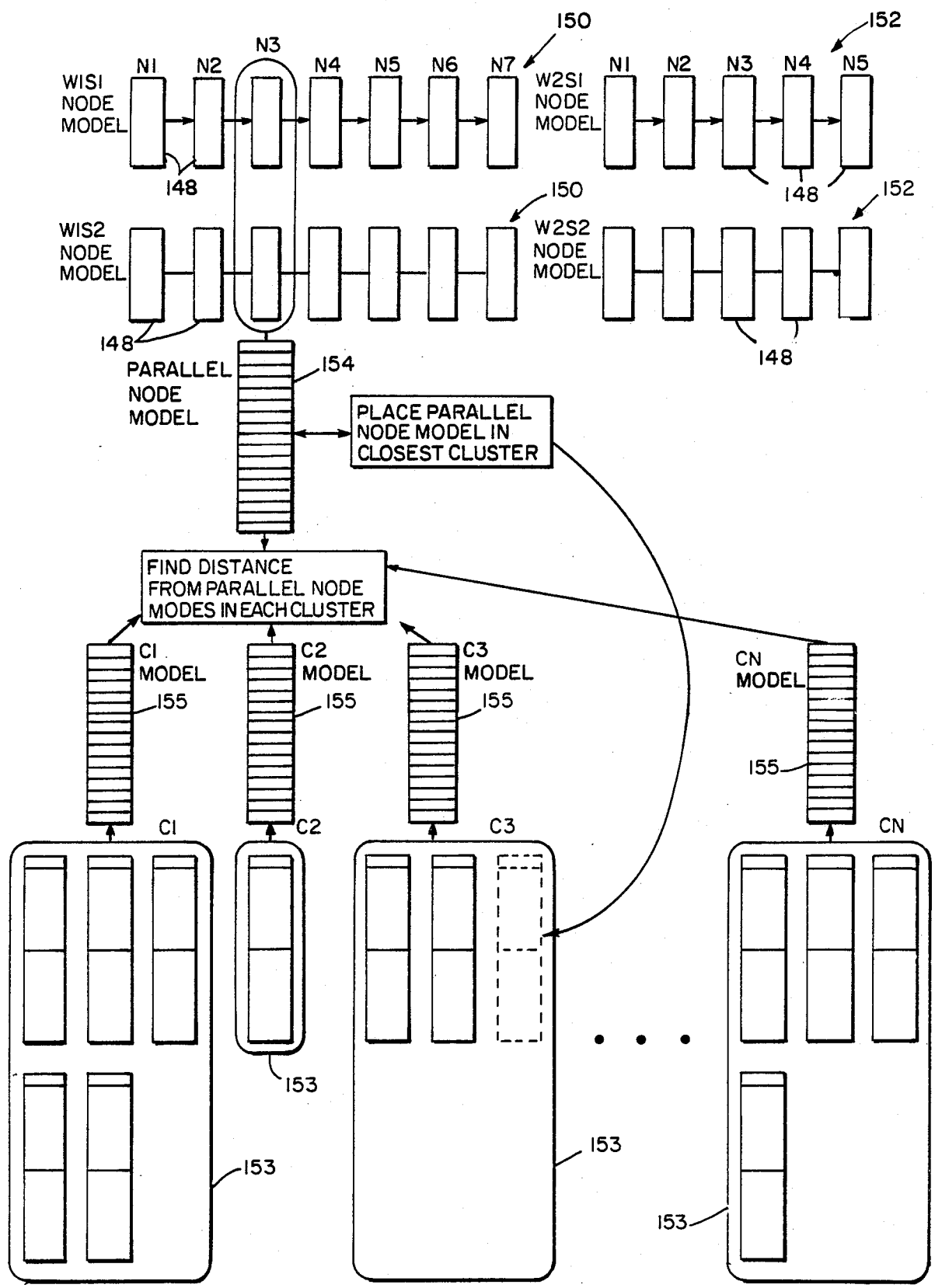
FIG. 11 is a schematic representation of a clustering process in which parallel node models of the type produced in FIG. 10 are grouped into clusters, each of which has a probability distribution, or cluster model, similar in form to that of the parallel nodes.
Figure 13:
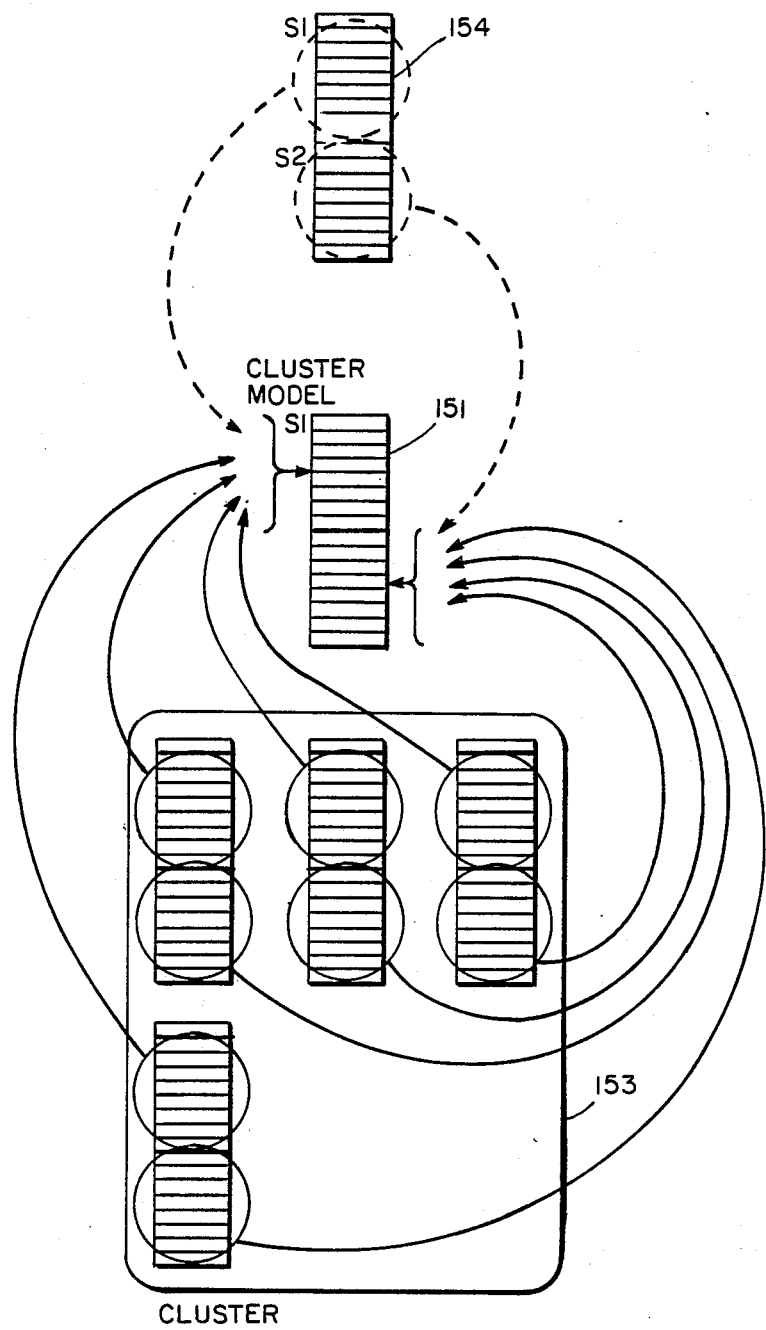
FIG. 13 is a schematic representation of the calculation of a cluster model of the type used in the process of FIG. 11.

Referring now to FIGS. 11 through 13, the parallel nodes 154 are divided by use of a clustering algorithm into a plurality of clusters, or groupings, 153 of similar parallel nodes. Each of the clusters C1, C2, C3, ... Cn, have associated with them a cluster model 155 with an 8-by-m dimensional probability distribution corresponding in form to the 8-by-m probability distribution of each of the parallel node models 154.

As is illustrated by the flow chart of FIG. 12, this clustering algorithm consists of the sequence of steps 156. This sequence comprises a sub-sequence of steps 158 which perform a single pass of the clustering algorithm. In the preferred embodiment, this sub-sequence 158 is repeated ten times, so that ten passes of the clustering algorithm are made. It has been found experimentally that ten passes are usually enough to let the clustering algorithm substantially converge into a somewhat optimal division of the parallel nodes 154.

Each pass 158 of the clustering algorithm includes performing a sequence of sub-steps 162, 164, 178 and 190 for each parallel node to be clustered. The first of these steps, step 162, is to set the variable closest_cluster—distance equal to a number larger than the clustering threshold used in step 178, described below.

After the step 162 has been performed, the algorithm advances to the steps in block 164. Block 164 is comprised of a sequence of steps 166, 168, and 172 which are performed for each presently existing cluster.

The first of these steps is step 166. It tests to see if the current node for which the steps 162, 164, 178, and 190 are being performed is the only node in the current cluster for which the steps of block 164 are being performed. If so, the current cluster is what is known as a singleton cluster, that is, a cluster with only one node in it. On the first pass of the clustering algorithm this test will never be met, because the current node will not have yet been placed in a cluster. But in successive passes the test may be met, because the current node will have been placed in a cluster by the previous pass.

If the current node is the only node in the current cluster, step 166 instructs the algorithm to terminate performing the steps of block 164 for the current cluster and to advance to performing those steps for the next cluster. Without step 166, the node of a singleton cluster would always be reclustered into the same singleton cluster. This is because the cluster model of a singleton cluster has exactly the same probability distribution as the node which is in it, and thus, the clustering algorithm would always find the singleton cluster to be the closest cluster to its own node. The purpose of clustering, however, is to group together similar nodes. Thus it is desirable to group a node from singleton clusters into another cluster, unless the distance between that node and all other clusters is greater than the clustering threshold. Step 190, described below, insures that a node remains a singleton cluster if, in fact, it is further than the clustering threshold distance from any other cluster.

If the current node is not the only node in the current cluster, the algorithm advances to step 168. In this step a distance is calculated from the current node to the model of the current cluster. As is illustrated in FIGS. 11 and 13, each cluster has associated with it an 8-by-m dimensional cluster model, where m is the number of speakers whose nodes have been combined to form the parallel nodes 154. In the drawings m is illustrated as two. As is explained above, however, in the preferred embodiment m is actually a larger number. The mu's and sigma of each dimension of the cluster model are calculated according to the following formulas:

$$mu_c = \frac{sum(n_i mu_i)}{sum(n_i)}$$

$$sigma_c = \frac{sum(n_i sigma_i)}{sum(n_i)}$$

Where $mu_c$ and $sigma_c$ are the mu and sigma of the cluster model for a given parameter and where $n_i$ is the number of frames from which the ith node is derived, $mu_i$ and $sigma_i$ are the mu and sigma of the ith node respectively, and where "sum" means the sum over all i nodes.

It will be appreciated by those skilled in the mathematical arts that the value of mu calculated for the cluster model for a given dimension of its probability distribution will equal the average of its corresponding parameter value over all of the frames of all of the nodes from which that cluster model is derived. It will also be understood by those skilled in the mathematical arts, however, that the value of the sigma calculated for a given dimension of the cluster model will not be exactly equal to the sigma of its corresponding parameter value over all of the frames of all of the nodes from which the cluster model is derived. This is because when one averages together sigma's taken relative to different mu's the resulting average does not equal the sigma of the data from which the average sigma's were themselves derived. Experimental results, however, indicate that this difference often does not significantly affect the quality of the clustering produced by the algorithm 156. If, however, it is desired to obtain more accurate sigmas for a cluster model 155, they can be calculated by computing such sigmas directly from all of the frames in all of the nodes placed in the given cluster.

As FIG. 13 indicates, the cluster model 155 is formed by combining together each of the eight dimensions of the probability distribution associated with each speaker. As is shown in FIG. 13, when the distance calculation of step 168 is made the value of the cluster model 155 is calculated as if the node model 154 being compared with it were already in it.

Once the cluster model has been calculated in this way, the distance between the node and the cluster is calculated using a distance metric based on the expectation of disparity between the likelihood scores which the probability distribution of the node and the probability distribution of the cluster model would assign to a distribution of frames x generated by the probability distribution of the node. This formula can be stated generally as follows:

$$\text{Metric} = E_i[g\{s_n(x), s_c(x)\}]$$

where $E_n$ is the expected value of the expression in square brackets which follows it over the distribution of frames x in the probability distribution of the node $f_n$, where $s_n(x)$ is a score derived from the likelihood that a given frame x would be generated by the probability distribution $f_n$ of the node, where $s_c(x)$ is a score derived from the likelihood that a given frame x would be generated by the probability distribution $f_c$ of the cluster model, and where g{a,b} is a function of the disparity, or more loosely speaking, the difference, between $s_n(x)$ and $s_c(x)$.

In the preferred embodiment this metric is given a generalized form based on the well known Kullback-Leibler information. This generalized form is as follows:

$$K(f_n,f_c) = E_n[h(\log\{f_n(x)/f_c(x)\})]$$

It can be seen that when the function h (y) has the form h(t)=y, this generalized formula reduces to:

$$K(f_n,f_c) = E_n(\log\{f_n(x)/f_c(x)\})$$

which is the formula for the Kullback-Leibler information. In the generalized formula $E_n$ is the expected value of the expression in square brackets which follows it over the distribution of $f_n$; where $f_n$ is the 8-by-m dimensional probability distribution of the parallel node; where $f_c$ is the 8-by-m probability distribution of the cluster model; where h(x) is a function the value of which is zero where x equals zero; where $f_n(x)$ is the likelihood that a given combination of m frames would be generated, one by each of the m speakers, according to the parallel node distribution model $f_n$; and where $f_c(x)$ is the likelihood that such a combination of m frames would be generated by the probability distribution $f_c$ of the current cluster model.

In one preferred embodiment the equation h(x) is equal to the absolute value of x raised to the power z (i.e., $h(x) = |x|^z$), where z is any positive number. Satisfactory results have been achieved using $h(x) = x^2$, where z is any positive interger. It is believed by some that it is advantageous to have $h(x) = |x|^z$, because it prevents instances where $f_n(x)/f_c(x)$ is a fraction between zero and one from contributing a negative distance to the Kullback-Leibler metric. Some feel that such negative distances are inappropriate, believing it is improper to indicate that the distance between a node and a cluster is less if $f_c(x)$ is greater than $f_n(x)$ than if the two values are equal. It is to be understood, however, that in other embodiments other values of the function h (x) might be used. For example, in one preferred embodiment h(x)=x, causing the formula to be that of the well known Kullback-Leibler information.

After the distance between the current node and current cluster have been calculated in step 168, the program advances to step 172. There a test is made to see whether this distance is less than closest_cluster_distance, the shortest distance between the current node and any cluster calculated previously during the current pass. If the just calculated distance is less than the shortest previously calculated distance, the two steps 174 and 176 shown in the block 172 are performed, otherwise they are not. In the first of these two steps, step 174, the value of the variable closest_cluster_distance is set equal to the distance between the current node and the current cluster. In the second, step 176, the variable closest_cluster is set equal to the number of the current cluster, so the program can keep track of which cluster is currently considered closest to the current node.

After the steps within block 172 are completed for the last presently existing cluster, the steps of block 164 are complete for the current node, and the processing of the current node advances to the group of instructions contained in the block 178. These instructions start out with a test to see if the variable closest_cluster_distance is less than the clustering threshold and if the current node is not in the cluster indicated by the variable closest_cluster. If both these tests are true, the steps 180, 186, and 188 are all carried out for the current node, otherwise the program immediately skips to step 190.

If the program advances to step 180, another test is performed. This one checks to see if the current node is presently in a cluster other than the closest cluster. If so, the steps 182 and 184 are carried out, otherwise the program immediately advances to step 186. This test is performed because during the first pass of the clustering algorithm the node will not have been placed in any cluster by the time the program gets to step 180. But during subsequent passes, any time the program advances to step 180, the current node will be in a cluster other than closest_cluster. In this case the program removes the current node from its previous cluster in step 182 and then, in step 184, recalculates the model for that previous cluster to reflect the node's withdrawal.

After completing the steps in block 180 the program advances to step 186, in which it places the current node in the closest cluster. Then it advances to step 188, where it recalculates the model of the closest cluster to reflect the node's addition. At this point all of the steps of block 178 are completed for the current node.

After completing the steps of block 178, the program advances to block 190. This block starts with a test to determine if the variable closest_cluster_distance is greater than the clustering threshold. If so, the steps 192 and 198 will be performed. Otherwise, the program skips to the end of the block 190, which is also the end of the block of steps 158 performed for each node. This test at the start of block 190 can only be met if the test at the start of block 178 has failed. Thus, for a given node in a give pass, the steps 192 and 198 are carried out only if the steps 180, 186, and 188 are not.

If closest_cluster_distance is greater than the clustering threshold, the program advances to step 192, where it performs a test to determine if the node is in a cluster, as it will be in all but the first pass of the clustering algorithm. If the test is met, the node is removed from that cluster in step 194, and then, in step 196, the model for the cluster is recalculated to reflect the node's withdrawal. If the test is not met the program advances immediately to step 198. In step 198 the current node is placed in its own cluster, which is given a cluster model having the same 8-by-m probability distribution as that node.

When the first pass of clustering algorithm 156 performs the steps of block 158 upon the first node, there are no presently existing clusters. Thus the program skips the steps of block 164, because there are no clusters, and skips the steps of block 178, because there is no closest_cluster_distance less than the clustering threshold. Thus the program places the first node in its own cluster in step 198. When the first pass executes the block 158 for the second node, step 168 calculates the distance between the second node and the cluster formed by the first node. If that distance is less than the clustering threshold, block 178 places the second node in the cluster formed by the first. Otherwise step 198 places the second node in its own cluster. The first pass repeats this process for each node, placing it in the cluster to which it is closest if its distance to that cluster is less than the clustering threshold, or placing it in its own cluster if the distance to the closest is above the clustering threshold.

In successive passes of the clustering algorithm each node is already placed in a cluster. In such successive passes, each node is compared to each currently existing cluster. The only exception is that indicated in step 166, in which the current node is not compared with its own cluster if it is the only node in that cluster. In such successive passes each node is placed in the cluster to which it is closest unless its distance to the closest cluster is greater than the clustering threshold, in which case it is again placed in its own separate cluster.

As a general rule during each successive pass of the clustering, the number of nodes which change clusters tends to decrease until a local optimum is achieved. However, some minor oscillation in the clustering populations may continue. Experiments have indicated that repeating the process 158 ten times is normally sufficient to obtain relatively optimal clustering.

Figure 14:
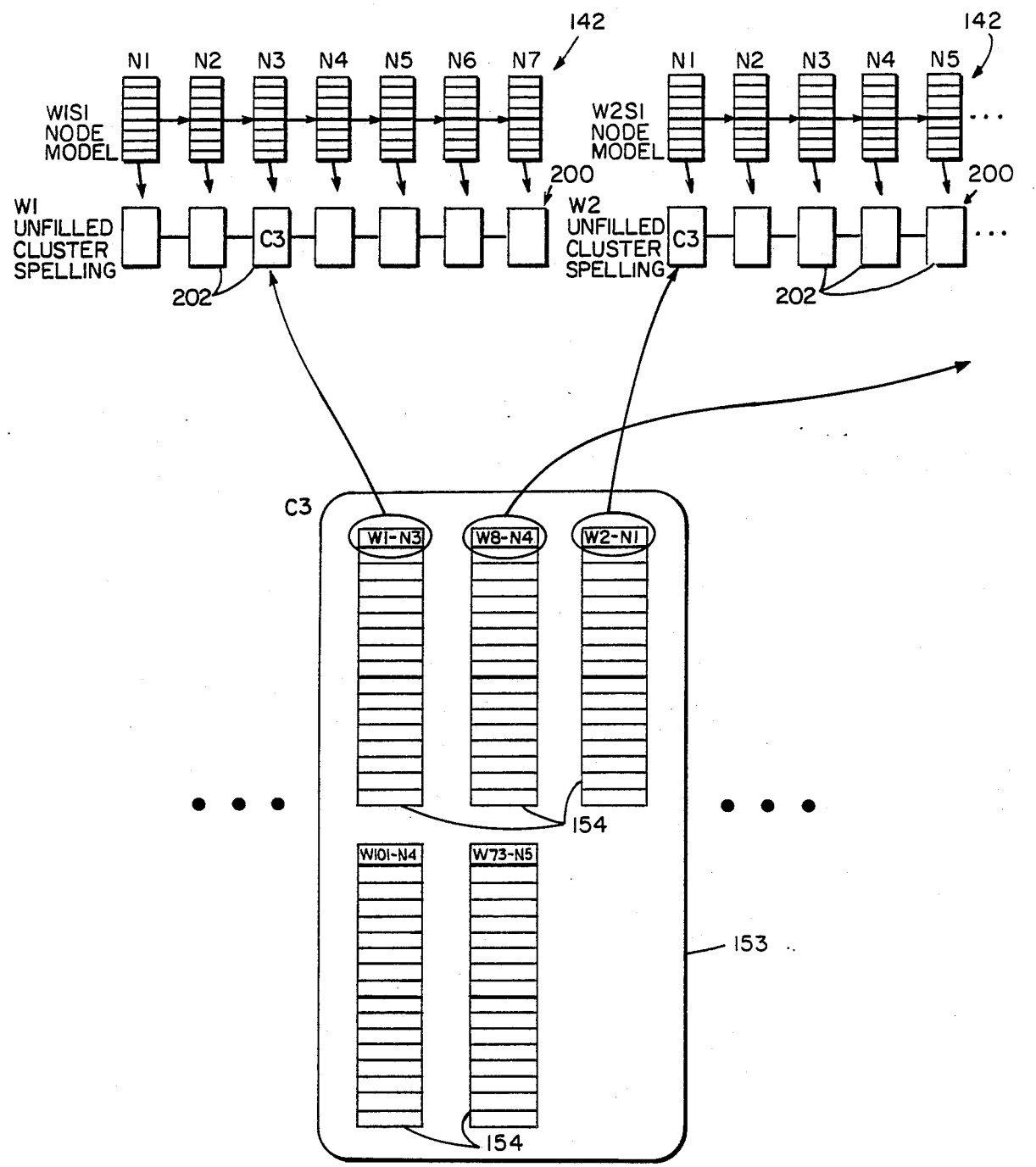
FIG. 14 is a schematic representation of how cluster spellings are derived for individual words from the clusters of the type produced in FIG. 11.

Referring now to FIG. 14, once the parallel nodes 154 have been clustered, cluster spellings for all the words in the vocabulary are derived. The method of creating cluster spellings involves producing an initially blank cluster spelling 200 for each word in the vocabulary. This initially blank cluster spelling has a separate memory space for storing a cluster identification number 202 for each node of the word models 142 created for that word by the process of FIG. 8.

Once the blank cluster spellings have been created, the program reads each parallel node 154 from each cluster 153, to determine which node of which word it was derived from. As is indicated in FIG. 14, each parallel node 154 has a header which identifies the word, and node number within that word, from which each such node was derived. For example, the first node 154 shown in the cluster C3 of FIG. 14 has a header indicating that it is the third node of the first word. Thus, the program inserts the cluster ID for cluster C3 in the third node of the cluster spelling 200 of the first word to indicate that the parallel node model derived from the third node of that word was placed in cluster C3. Similarly, the third parallel node model 154 of cluster C3 has a header indicating it is the first node of the second word. Thus the program places the cluster ID for cluster C3 into the memory space associated with the first node of the cluster spelling of the second word. Once this process has been completed for each node in each cluster, each word has associated with it a cluster spelling which identifies the sequence of clusters into which each of its nodes has been placed.

Figure 15:
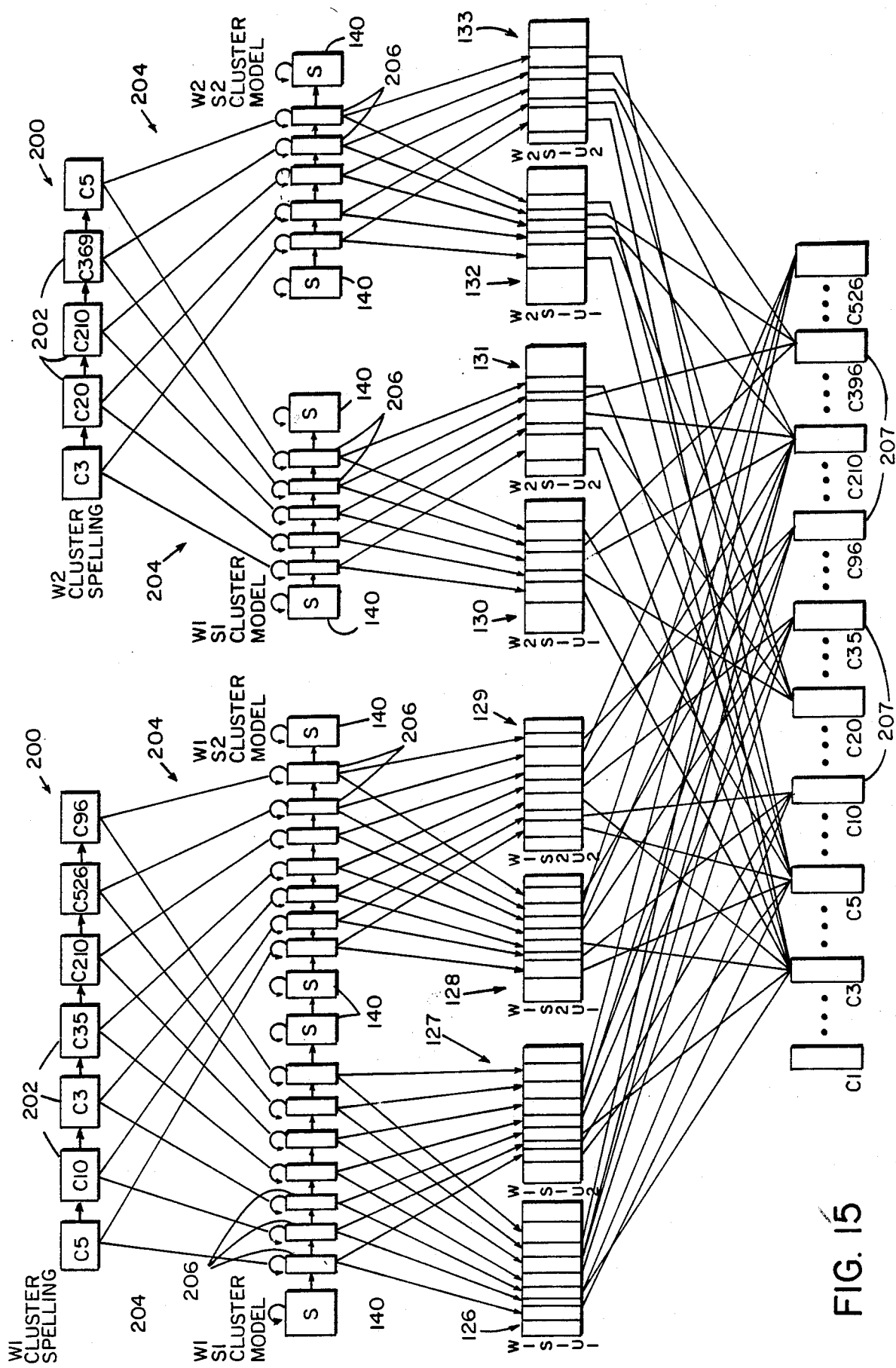
FIG. 15 is a schematic representation of how multi-speaker models can be derived for each cluster produced in FIG. 11, by time aligning each utterance of each word against an acoustic model of its word produced by associating with each of that word's clusters the portion of that cluster's model derived from the utterance's speaker, and then combining, over all utterances by all speakers, the frames time aligned with each cluster.

Referring now to FIG. 15 a process is shown for deriving multiple-speaker, eight-dimensional probability distribution models for each of the clusters used in the system's cluster spellings 200. According to this system the cluster spelling 200 for each word has associated with it a separate individual-speaker cluster word model 204 for each of the m speakers for which word models 150 have been developed in the process of FIG. 9. Each of these individual-speaker cluster-based word models 204 is formed by associating with each cluster ID 202 of a cluster spelling 200 the eight dimensions of that ID's corresponding cluster model derived from the individual speaker for which the model 204 is formed. After a sequence of these eight-dimensional individual-speaker cluster-based models have been strung together for each word, a silence model 140 is added to the beginning and end of each such sequence, forming an acoustic model for a discrete utterance of that word.

Once this has been done, dynamic programming is used to time align each individual-speaker cluster-based word model 204 against each utterance by its speaker of its word. This is illustrated in FIG. 15 by the time alignment of utterances 126 and 127, by speaker 1 of word 1 against an individual-speaker cluster-based word model 204 of word 1 for speaker 1. Similarly, utterances 128 through 133 are shown being time aligned against their corresponding individual-speaker word models 204. This process of time alignment resegments the frames of each such utterance into a succession of sub-sequences which best match the succession of clusters in the individual-speaker word models 204. After this has been done for each word in the vocabulary, all frames, from all words and all speakers, time aligned with a given cluster are grouped together, and a mean and an absolute deviation are calculated for each of their eight parameters. The resulting eight-dimensional probability distribution is then used as a multi-speaker model 207 for that cluster. This process is performed for all of the clusters used in the cluster spellings 200.

It can be seen that the process described with regard to FIGS. 2 through 15 provides a method for deriving a cluster spelling for each word in a vocabulary, and a method for deriving a multi-speaker acoustic model for each cluster used in such cluster spellings.

Figure 16:
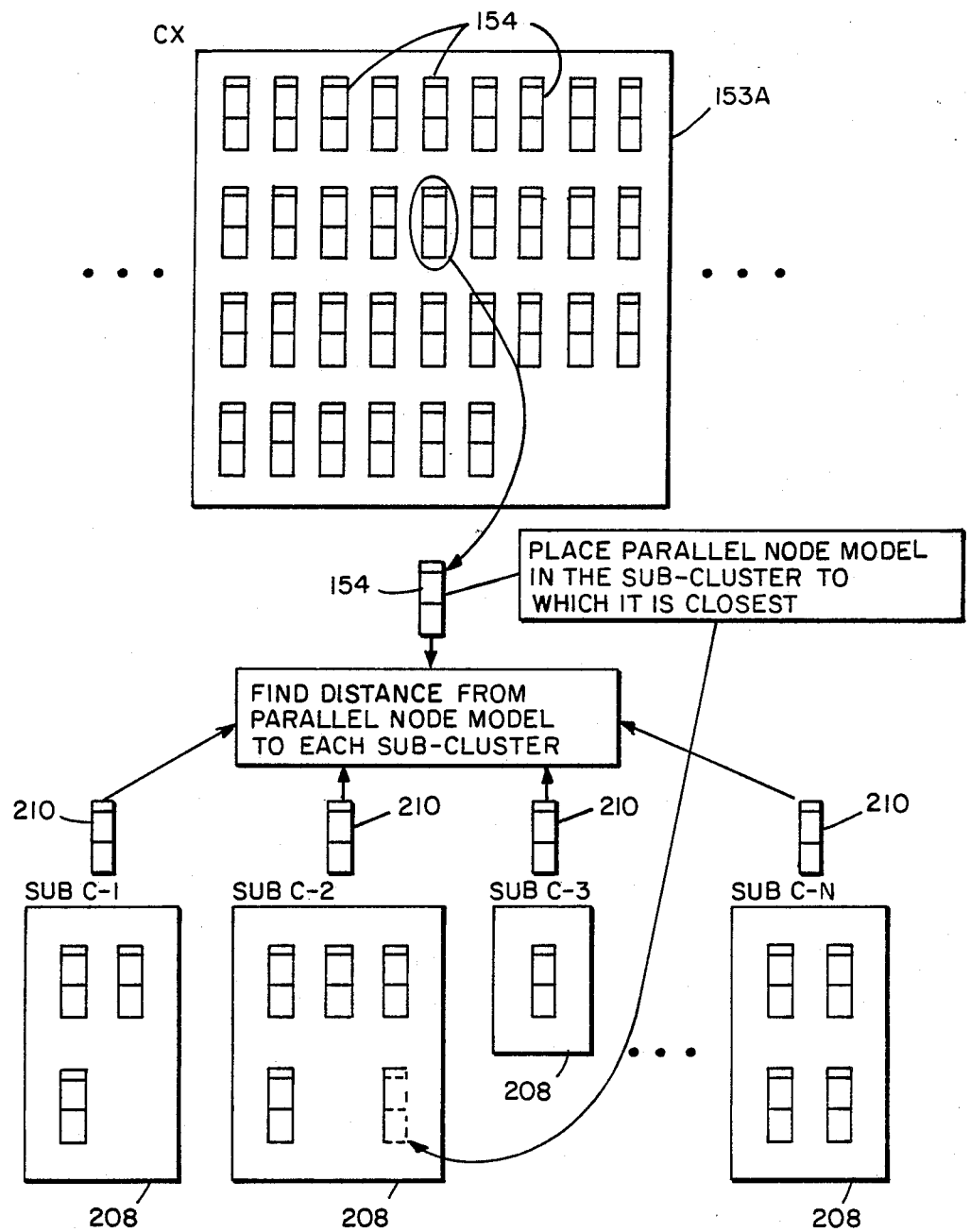
FIG. 16 is a schematic representation of how hierarchical clustering can be used according to the present invention by taking clusters of the type formed in FIG. 11 and further clustering the nodes within them into subclusters.

Referring now to FIG. 16 an alternate embodiment of the method of the present invention is described. According to this alternate embodiment, the clustering process described above with regard to FIGS. 10 through 13 is performed in a hierarchical manner. In such hierarchical clustering, the parallel node models 154 are divided into first level clusters 153A using the algorithm of FIG. 12. Then the algorithm of FIG. 12 is used again to cluster the nodes in each of these first level clusters 153A into sub-clusters 208.

When the algorithm of FIG. 12 is run to derive the first level clusters 153A, the clustering threshold used in that algorithm is set to a relatively high value. This produces relatively few and relatively large first level clusters. Once the first level clusters 153A have been derived, the algorithm in FIG. 12 is used to cluster the nodes 154 of each cluster 153A, such as the cluster CX in FIG. 16, into a plurality of subclusters 208. This subclustering calculates the distance between each node 154 and each subcluster 208 by comparing the node 154 with the subcluster model 210 of each sub-cluster 208. These subcluster models 210 are identical in form to the cluster models 155 shown in FIG. 11. Each parallel node 154 is placed in the subcluster to which it is closest in each pass of the clustering algorithm. This is true unless the node's distance from the closest subcluster is greater than a clustering threshold, in which case the node is placed in its own cluster, as is described above with regard to FIG. 12. In the subclustering process the clustering threshold is substantially smaller than that used to create the first level clusters 153A.

Subclustering has several advantages. One is that is requires less time, since it does not require each node to be compared with all clusters. Instead it only requires each node to be compared with the relatively small number of first level clusters until the first level clustering has converged. Then, during second level clustering, the node only has to be compared to each subcluster of the single first level cluster into which the node has been placed. This produces a significant saving in time when compared to a one-level clustering process, in which each node has to be compared with all clusters in all passes of the clustering algorithm.

Another reason for hierarchical clustering is that it is possible, particularly by using human intervention, to make each of the first-level clusters correspond to an individual phoneme. If this is done, the subclusters of each first-level cluster will correspond to the different sounds, or allophones, associated with its phoneme.

There are many different techniques known in the art of digital speech processing for placing individual frames or nodes into groupings of such frames or nodes which are associated with a common phoneme. A method of doing this which has been developed by the inventors of the present invention is to cluster nodes in the manner described above in FIGS. 10 through 13 so as to derive cluster spellings for each of a plurality of words. A program is then used which enables a human operator to see both the English spelling and the cluster spelling of that word. The program also provides the human operator with the capability of seeing the English and cluster spelling of other words which have a given cluster ID. By comparing the cluster spellings of words which have a common phonetic sound, it is possible for a human to determine which clusters correspond to which phonemes. The program then enables the operator to label each cluster ID with a corresponding phonetic identification. The human operator can then combine together into a large phonetic cluster all of the nodes or clusters which represent a common phoneme.

Once this is done a phonetic cluster can be created which contains all the nodes originally associated with this human created cluster. At this point the algorithm of FIG. 12 can be used to subcluster this large phonetic cluster into a more optimally divided set of subclusters. A major advantages of using such phonetic subclustering is that it enables each subcluster to have associated with it a humanly recognizable phonetic label indicating the phoneme with which it is associated.

Figure 18:
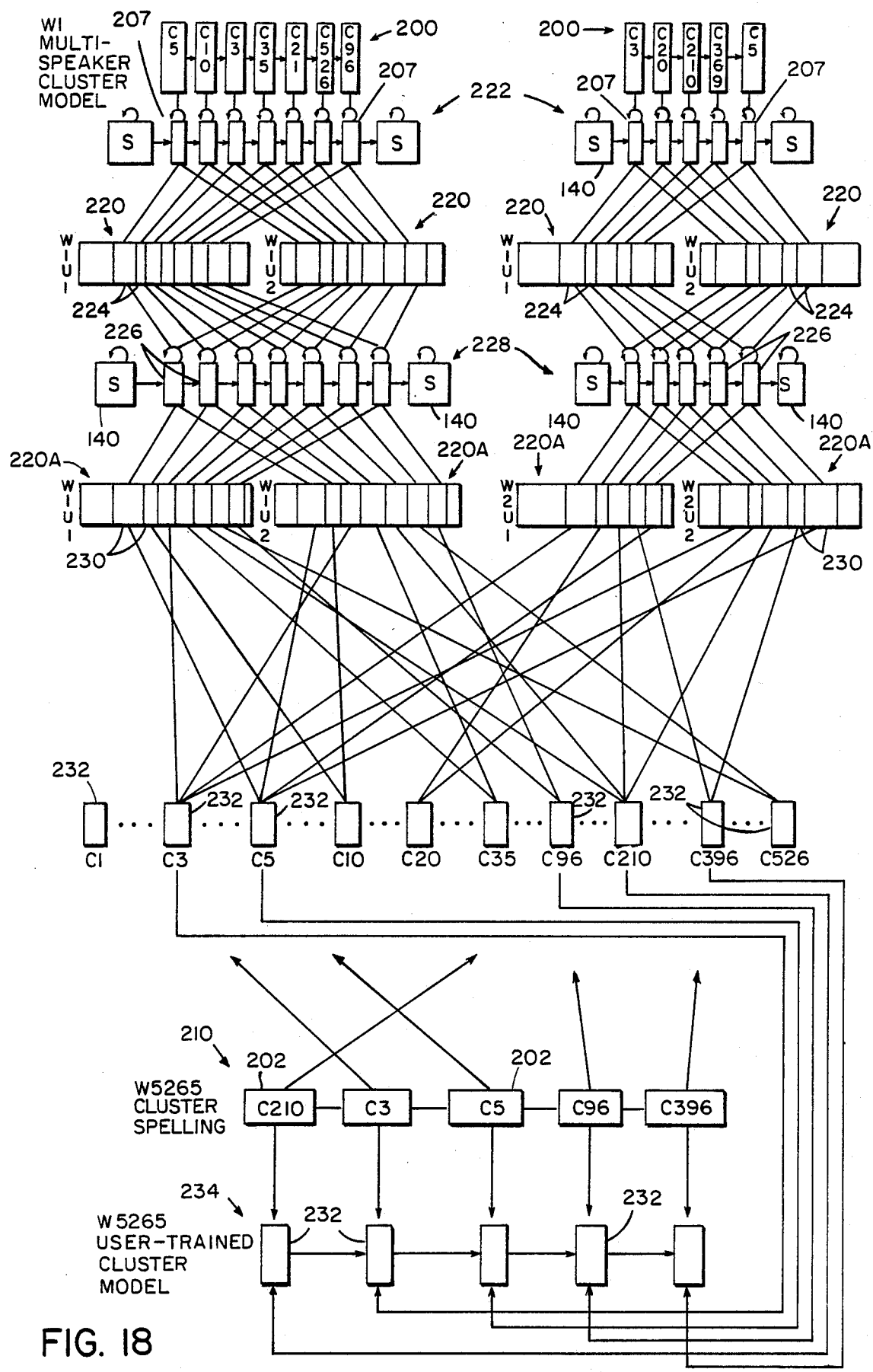
FIG. 18 illustrates the process by which the frame sequences produced by training utterances are time aligned against multi-speaker cluster models of their corresponding words, by which the frames time aligned with each cluster are combined to from a user-dependent acoustic cluster model, and by which resulting cluster models are associated with the cluster spelling of a given word to create a user-dependent acoustic representation of that word.

Referring now to FIGS. 17 through 19, a description is made of how an individual user can train a system which has the cluster spellings 202 and the multi-speaker cluster models 207 derived by the processes described in FIGS. 2 through 15.

According to this process, a user speaks a predetermined sequence of discrete words. For purposes of simplification this is illustrated in FIG. 17 by having the user speak two training utterances 220 of each of two words. It is to be understood, however, that the user should actually speak enough words so that the cluster spellings of all the words he speaks will contain multiple occurrences of each of the clusters used in the vocabulary of the system. Experiments have indicated that systems can operate successfully with a greatly varying number of clusters, but it is preferred that the number of clusters exceed 500. With such a number of clusters, it is desirable to have approximately 15 to 30 minutes of speech to train a system of the type described herein.

Referring now to FIG. 18, once the training utterances 220 of the training script have been spoken by the user, they are time aligned by dynamic programming against a multi-speaker cluster-based word model 222 of their corresponding word. The multi-speaker cluster-based word models 222 are derived by replacing each cluster ID in the cluster spelling 200 of a word by its associated multi-speaker cluster model 207 derived by the process of FIG. 15. This dynamic programming technique divides each of the training utterances 220 into a plurality of sub-sequences 224, in a manner similar to that in which the process of FIG. 8 divided utterances 126 and 128 into a plurality of sub-sequences 146. After each of the training utterances have been divided into sub-sequences 224, all of the frames from different utterances of the same word which have been time aligned against the same multi-speaker cluster model 207 are combined to form a node model 226. These node models 226 are formed in the same manner as, and have the same form as, the node models 144 and 148 formed in the processes of FIGS. 8 and 9, respectively.

The sequence of node models 226 produced for a given word by the process of FIG. 18 are strung together to produce an user word model 228. The silence frames in each of the training utterances 220 are combined to form a silence model 140 similar to the silence model 140 described above with regard to FIG. 5. Once the silence model has been appended to the beginning and end of the user word model 228 of a given word, each of the training utterances associated with the word are time aligned against those word models to perform a second more accurate segmentation of that utterance into a succession of new sub-sequences 230. This second process of segmentation tends to yield more accurate segmentation, since it is performed against a word model derived from the speaker of the utterances being segmented. This process of segmenting utterances, combining corresponding sub-sequences to form a new word model, and then resegmenting the utterance against a new node model can be repeated a plurality of times to obtain a relatively optimal segmentation.

After the final such segmentation has been performed for all words, the program combines together all the frames from all the utterances of all words which correspond to each cluster. This is done to derive a user-trained cluster model 232 for each cluster used in the cluster spellings of the system's vocabulary. These user-trained cluster models 232 have the same form as the multi-speaker cluster models 207 produced by the process of FIG. 15.

Once such user-trained cluster models have been derived, the system is capable of producing an acoustic representation of any word in its vocabulary, such as the word 5265 shown in FIG. 18. It is capable of doing this by associating with each of the cluster ID's 202 of the cluster spelling 200 of a word the user-trained cluster model 232 for that cluster. As a result each such word has associated with it a user-trained acoustic model 234.

The process of FIG. 18 repeatedly time aligns training utterances against their corresponding word models to divide them into subsegments from which speaker-dependent cluster models are formed. But in the repeated time alignment of FIG. 18, the dynamic programming elements of individual word models are updated with information from their corresponding utterances only. In an alternate embodiment of the invention, however, new cluster models are formed after each time alignment, enabling the dynamic programming elements of each word model to be updated with acoustic information from all occurrences of its utterances.

In this alternate embodiment each training utterance is initially divided into subsequences by time alignment against a multi-speaker cluster-based word model, in the same manner as is shown in FIG. 18. But then initial user-trained cluster models are formed for each cluster by combining together all the frames, from all utterances, which correspond to that cluster. These initial user-trained cluster models are then associated with the cluster spellings of the training words to form initial speaker-dependant acoustic models for each such word. These updated word models are time aligned against their corresponding utterances, dividing those utterances into new subsegments, new user-trained cluster models are formed by combining all frames, from all utterances, corresponding to each cluster. This process of updating word models, resegmenting utterances, and forming new cluster models is repeated several times until a relatively optimal set of clusters is obtained.

This alternate embodiment is particularly useful when only one or two utterances of each training word are said. In such instances, there is often not enough statistical information in the utterances associated with each word to provide for its proper segmentation. This alternate embodiment, however, derives information on each cluster from all utterances of any words that contain the cluster, and thus this embodiment provides more statistical information for segmentation.

As is indicated schematically in FIG. 19 these user-trained acoustic word models 234 are utilized to recognize a utterance 233 spoken by the user who has trained them. This is done by using dynamic programming to compare the utterance to be recognized against the user-trained acoustic word model of each word in the system's vocabulary. Such dynamic programming techniques are well known in the art of speech recognition. An improved method of performing such dynamic programming is described in detail in the above mentioned U.S. patent application Ser. No. 797,249, in which the user-trained acoustic word model 234 derived by the process of the present invention would be used in place of the node based word models described in the patent application.

It can be seen that a new improved method for representing words in speech recognition systems has been described above. This method has significant advantages compared to many methods for representing words used in the prior art. In particular, it enables a user to train the recognition system how he or she says each of a large vocabulary of words, without requiring the user to speak each such word in advance. It also has the great advantage of enabling a speech recognition system to efficiently store an acoustic representation for each of a large number of words. It makes it possible for the system to store the acoustic models of its vocabulary words as cluster spellings 200, rather than as node models. Such cluster spellings only require two bytes to store the cluster ID for each cluster in its spelling. This is a considerable storage savings, since the eight-dimensional probability distribution associated with each cluster requires sixteen bytes of storage, a byte to store each of its eight mu's and eight sigma's. The system only needs to store each user-trained cluster model once, because a complete acoustic model for a given word can be generated as needed by stringing together the cluster models corresponding to the word's cluster spellings.

In some embodiments of the invention, however, the words may be stored in a more lengthy form as sequences of cluster models, rather than as sequences of cluster IDs. With many forms of computing hardware this increases computational speed, since it stores each word as a complete acoustic model ready for dynamic programming, preventing the need for the system to create such acoustic models on the fly by linking together cluster models associated with the word's cluster spelling. The decision whether or not to represent each word in the vocabulary by a cluster spelling or by a sequence of acoustic cluster models depends upon a trade-off between the increase in memory required by the latter method as opposed to the increase in computation required by the former.

In the description above, the frames from which dynamic programming elements are calculated, and against which dynamic programming is performed, include eight, basically spectral, parameters. It should be understood that in other embodiments of the invention a different number of spectral parameters, or parameters other than spectral parameters, can be used. For example, frames comprised of linear predictive coding parameters can be used with the present invention instead of frames of spectral parameters.

In the description above the probability distributions used to model dynamic programming elements are Laplacian probability distributions, the shape of which is defined for each of a distribution's eight parameters by a mean and an absolute deviation. It should be understood that other types of probability distributions can be used with the present invention. It should also be understood that in other measures of central tendency besides the mean and other measures of spread besides the absolute deviation can be used to define dp element probability distributions with the present invention. Such other measures of central tendancy include medians and trimmed means, and such other measures of spread include standard deviation and interquartile ranges.

In the preceding text and in the claims that follow, the phrase "dynamic programming" has been used to include all methods used in the art of speech processing for optimally time aligning a sequence of frames against a sequence of nodes. The phrase is meant to include both the Viterbi algorithm and the Baum-Welch algorithm, even though some purists consider the Baum-Welch algorithm to be "dynamic programming-like" rather an actual dynamic programming algorithm.

In the description above the dynamic programming techniques are all ones which time align a sequence of frames against a sequence of nodes. However, it should be understood by those skilled in the art of dynamic programming that a corresponding result can be achieved by dynamic programming a sequence of frames against a sequence of arcs. In the claims that follow, the phrase "dynamic programming element" is used to cover the use of either nodes or arcs in dynamic programming.

It should also be understood that, in the text that precedes and in the claims that follow, description is made of receiving a sequence of frames associated with the utterance of a given word. It is to be understood that in this sense the term "word" is meant to include not only single words, but also any sequence of words which are spoken together as a single utterance.

In this specification and the claims that follow, the measurement used to determine into what if any cluster a node should be placed is referred to as a "metric", and this metric is referred to as measuring the "distance" between a given node and a given cluster. The words "metric" and "distance" are used herein to provide a relatively easy to understand, and a generally intuitively correct, description of the measurement used in clustering. It will be understood, however, by those skilled in the mathematical arts that the Kullback-Leibler-like formula set forth above and in the claim is not, strictly speaking, a metric, since it is not symmetric. This Kullback-Leibler-like formula provides a measure of disparity between two probability distributions, not a distance in the strict sense of that term. Therefore, when reading this application and the claims that follow, please appreciate that the word "metric" refers to such a measure of disparity, and that the "distance" between a node and a cluster refers to the disparity between their probability distributions.

Accordingly, the present invention should not be considered to be limited by the description herein of the preferred embodiments, but rather should be interpreted in accordance with the following claims.

What we claim is:

1. A method of deriving an acoustic word representation for use in speech recognition systems, said method comprising:
   creating a word model for each of a plurality of words, each word model having a temporal sequence of acoustic models derived from one or more utterances of its associated word;
   clustering the individual acoustic models from each of the plurality of word models, so as to place individual models into clusters of relatively similar models;
   providing a cluster ID for each such cluster; and
   creating a cluster spelling for a given word, said cluster spelling including a collection of cluster IDs indicating the clusters into which the sequence of acoustic models of said given word's word model have been placed by said clustering.

2. A method of deriving an acoustic word representation for use in speech recognition systems, said method comprising:
   receiving a one or more sequences of acoustic frames for each of a plurality of words, each of said frames having a corresponding set of n parameter values;
   using dynamic programming to derive from said one or more frame sequences associated with each such word, a corresponding sequence of dynamic programming elements (hereinafter referred to as dp elements in this and depending claims), said dynamic programming including:
     creating a sequence of dp elements for each word, each having an n-dimensional probability distribution;
     using one or more iterations of dynamic programming to seek a relatively optimal match between the successive probability distributions of the sequence of dp elements for a given word and the successive parameter values of the one or more frame sequences associated with that word, so as to divide each of the one or more frame sequences associated with a given word into a plurality of sub-sequences each associated with one of said dp elements, each of said iterations involving calculating a new n-dimensional probability distribution for individual dp elements, each dimension of a given dp element's distribution being calculated as a function of corresponding parameter values from frames matched with the given dp element by said iteration;
   clustering the dp elements produced by said dynamic programming for each of said plurality of words into a plurality of clusters, said clustering including placing individual dp elements into the cluster of such elements which has a probability distribution closest to that element's own probability distribution, as determined by a certain statistical metric, and calculating an n-dimensional probability distribution for each cluster which is derived from the corresponding n-dimensional probability distribution of the dp elements placed within it; and
   creating a sequence of such clusters to represent a given word, with successive clusters of the sequence corresponding to successive dp elements in the sequence of such elements derived for the word by said dynamic programming, and with each such cluster being the cluster into which its corresponding dp element is placed by said clustering.

3. A method of deriving an acoustic word representation as described in claim 2, wherein said receiving of a sequence of acoustic frames includes receiving a plurality of sequences of acoustic frames for a plurality of said words, with each of said frame sequences received for a given word corresponding to a different utterance of said word.

4. A method of deriving an acoustic word representation as described in claim 3, wherein said receiving of a plurality of frame sequences includes receiving, for each word, frame sequences derived from each of m speakers, where m is an integer larger than one.

5. A method of deriving an acoustic word representation as described in claim 2, wherein said clustering of dp elements includes clustering together dp elements derived from utterances of different words.

6. A method of deriving an acoustic word representation as described in claim 2, wherein:
   said calculating of a new n-dimensional probability distribution for dp elements includes calculating a measure of central tendency and a measure of spread for each of said n-dimensions of a given dp element's probability distribution; and
   said calculating of an n-dimensional probability distribution for each cluster includes calculating a measure of central tendency and a measure of spread for each of the n-dimensions of said cluster probability distribution.

7. A method of deriving an acoustic word representation as described in claim 6, wherein:
   said certain statistical metric used in determining the closeness of a given dp element to a cluster, is derived from a formula of the following general form:

$$E_n[g\{s_n(x)\}]$$

where $E_n$ is the expected value of the expression in square brackets which follows it over the distribution of frames x in the probability distribution of the node $f_n$;
   where $s_n(x)$ is a score derived form the likelihood that a given frame x would be generated by the probability distribution $f_n$ of the node;
   wherein $s_c(x)$ is a score derived from the likelihood that a given frame x would be generated by the probability distribution $f_c$ of the cluster model;
   and where $g\{a,b\}$ is a function of the disparity, or more loosely speaking, the difference, between $s_n(x)$ and $s_c(x)$.

8. A method of deriving an acoustic word representation as described in claim 7, wherein:
   said certain statistical metric used in determining the closeness of a given dp element to a cluster, is derived from the following formula:

$$K(f_n,f_c) = E_n[h(\log\{f_n(x)/f_c(x)\})]$$

where $E_n$ is the expected value of the expression which follows it with respect to the given dp element distribution of values of x;

where $f_n$ is the probability distribution of the given dp element;

where $f_e$ is the probability distribution of the cluster; and where $h(x) = x^E$, where z is a positive integer.

9. A method of deriving an acoustic word representation as described in claim 7, wherein:

said certain statistical metric used in determining the closeness of a given dp element to a cluster, is derived from the following formula:

$$K(f_n, f_e) = E_n[h(\log\{f_n(x)/f_e(x)\})]$$

where $E_n$ is the expected value of the expression which follows it with respect to the given dp element distribution of values of x;

where $f_n$ is the probability distribution of the given dp element;

where $f_e$ is the probability distribution of the cluster; and where $h(x) = |x|^z$, where z is any positive number.

10. A method of deriving an acoustic word representation as described in claim 2 further comprising:

additional dynamic programming to re-divide each frame sequence into a new sequence of dp elements, said additional dynamic programming including:

using dynamic programming to divide each of said one or more frame sequences associated with a given word into a new plurality of sub-sequences by time aligning said frame sequence against the sequence of cluster probability distributions associated with that word as a result of the method described in claim 2; and calculating new n-dimensional cluster probability distributions based on the division of said frame sequences into said new sub-sequences.

11. A method of deriving an acoustic word representation as described in claim 10 wherein said calculating new n-dimensional cluster probabilities includes calculating an n-dimensional probability distribution for each cluster from the values of each of the n parameters of the frames associated with the new sub-sequences which are time aligned against that cluster by said additional dynamic programming.

12. A method of deriving an acoustic word representation as described in claim 11, wherein the combined process of said additional dynamic programming and said calculating of new n-dimensional cluster probability distributions is repeated more than once.

13. A method of deriving an acoustic word representation as described in claims 2, wherein said placing of each dp element into a cluster includes performing multiple clustering passes:

the first pass of which includes comparing each dp element to each cluster formed so far in said first pass, and placing it in the cluster to which it is closest according to said metric, unless, according to said metric, it is further than a specified threshold distance from any such clusters, in which case it is made into a separate cluster of which it is initially the only member; and the subsequent passes of which are substantially identical to said first pass, except that if said clustering places a given dp element into a cluster other than the one it is already in, the probability distribution of the cluster from which the dp element has been withdrawn must be recalculated to reflect the withdrawal of that dp element.

14. A method of deriving an acoustic word representation as described in claim 13, further including comparing a singleton cluster, that is, a cluster having only one dp element associated with it, if there is such a singleton cluster, with each other cluster, and combining it with the other cluster to which it is closest according to said metric, unless its distance from said closest other cluster, according to said metric, is more than a specified threshold.

15. A method of deriving an acoustic word representation as described in claim 13, wherein said comparing of each dp element to a cluster includes, when the dp element is not included in the cluster, temporarily altering the cluster for the purpose of the comparison to have the probability distribution which it would have if the dp element were in it.

16. A method of deriving an acoustic word representation as described in claim 2, wherein said clustering of dp elements includes:

clustering said dp elements into a relatively small number of first level clusters;

clustering the dp elements belonging to each of said first level clusters into a number of sub-clusters by:

placing individual dp element belonging to a given first level cluster into the sub-cluster of dp elements which has a probability distribution closest to that element's own probability distribution, as determined by a certain statistical metric; and calculating an n-dimensional probability distribution for each sub-cluster which is derived from the corresponding n-dimensional probability distributions of the dp elements placed within it; and wherein said creating of a sequence of clusters to represent a given word includes creating a sequence of sub-clusters to represent the word, with successive sub-clusters of the sequence corresponding to successive dp elements in the sequence of such elements derived for the word by said dynamic programming, and with each such sub-cluster being the sub-cluster into which its corresponding dp element is placed by said clustering algorithm.

17. A method of deriving an acoustic word representation as described in claim 16, wherein said clustering of said dp elements into said first level clusters includes placing substantially all the dp elements associated with a given phoneme in one first level cluster, so that said given first level cluster corresponds to a phoneme and so that all sub-clusters associated with that first level cluster correspond to sounds associated with that phoneme.

18. A method of deriving an acoustic word representation as described in claim 17, wherein said clustering of said dp elements into said first level clusters is done with human intervention to assure that substantially all the dp elements associated with said given phoneme are placed in said one first level cluster.

19. A method of deriving an acoustic word representation as described in claim 16, wherein said clustering of said dp elements into sub-clusters is performed automatically without human intervention.

20. A method of deriving an acoustic word representation for use in speech recognition systems, comprising:

receiving a first set of sequences of acoustic frames generated by one or more utterances of a given word, each of said frames having a set of n parameter values;

using dynamic programming, independently of any previously derived acoustic model particular to said given word, to automatically derive from said first set of frame sequences an initial acoustic model of said given word comprised of an initial sequence of acoustic probability distribution models, said dynamic programming including:

dividing each of said first set of frame sequences into a corresponding plurality of sub-sequences of frames independently of any previously derived acoustic model particular to said given word;

calculating a probability distribution model for each group of corresponding sub-sequences, which model includes an n-dimensional probability distribution, each dimension of which is calculated from one of the n corresponding parameter values of the frames occurring in its group of corresponding sub-sequences;

using dynamic programming to time align each of said first set of frame sequences against said sequence of probability distribution models;

dividing each of said first set of frame sequences into a new corresponding plurality of sub-sequences of frames based on said time alignment against said sequence of probability distribution models;

calculating a new probability distribution model, of the type described above, for each group of corresponding sub-sequences;

repeating one or more times the steps of using dynamic programming to time align, dividing each of said first sets of frame sequences into a new corresponding plurality of sub-sequences, and calculating new probability distribution models; and storing the sequence of probability distributions calculated by the last repetition of these three steps as said initial acoustic word model (hereinafter referred to as the initial sequence of probability distribution models in this and depending claims);

using dynamic programming to time align each of a second set of frame sequences generated by one or more utterances of said given word against said initial sequence of probability distribution models, so as to divide each of said second set of frame sequences into a corresponding plurality of new sub-sequences, with each of said new sub-sequences being associated with one of said probability distribution models; and calculating a dynamic programming element (hereinafter referred to as a dp element in this and depending claims) for each group of corresponding new sub-sequences, which dp element includes an n-dimensional probability distribution, each dimension of which is calculated from one of the n corresponding parameter values of the frames of its associated group of corresponding new sub-sequences.

21. A method of deriving an acoustic word representation as described in claim 20, wherein:

said second set of frame sequences includes a plurality of frame sequences derived from the utterance of said given word by each of m speakers, where m is an integer larger than one; and said using of dynamic programming to time align is used to time align said frame sequences from each of said m speakers against said initial sequences of probability distribution models, so as to divide each of said frame sequences from each speaker into a corresponding plurality of new sub-sequences, with the corresponding new sub-sequences from different frame sequences being time aligned against the same probability distribution model in said initial sequence.

22. A method of deriving an acoustic word representation as described in claim 21, wherein information from corresponding new sub-sequences from said m speakers are combined to derive multiple speaker word models.

23. A method of deriving an acoustic word representation as describe in claim 21:

wherein the method described in claim 21 is performed for each of a plurality of words;

wherein said calculating of a dp element includes calculating a separate dp element for each group of said corresponding new sub-sequences from the different frame sequences from said m speakers;

further including grouping together all the dp elements from said m speakers which correspond to the same initial probability distribution model of the same word to form a parallel dp element having a probability distribution with n separate probability distribution for each of said m speakers; and further clustering said parallel dp elements into a plurality of multi-speaker clusters, said clustering including placing individual parallel dp elements into the cluster of such elements which has a probability distribution closest to the element's own probability distribution, as determined by a certain statistical metric, and calculating an n times m dimensional probability distribution for each multi-speaker cluster which is derived from the corresponding n times m dimensional probability distribution of each of the parallel dp elements placed within it.

24. A method of deriving an acoustic word representation as described in claim 23, further including calculating a multi-speaker n-dimensional probability distribution for each of said multi-speaker clusters, the value of each dimension of which is derived from the corresponding parameter value from the frames of sub-sequences of frames associated with parallel dp elements which have been placed in that multi-speaker cluster.

25. A method of deriving an acoustic word representation as described in claim 24, further including making an acoustic representation for a given word by taking said initial sequence of probability distribution models for that word and replacing each of the models in said initial sequence with the multi-speaker n-dimensional probability distribution for the multi-speaker cluster in which the parallel dp element corresponding to that model was placed.

26. A method of deriving an acoustic word representation as described in claim 20, wherein said receiving of a first set of frame sequences includes receiving a plurality of such sequences generated by a plurality of utterances of said given word;

said dividing of said first set of frame sequences into sub-sequences includes dividing each of said first set of frame sequences into a corresponding plurality of initial sub-sequences; and said calculating of a probability distribution model for each of said initial sub-sequences includes calculating one such model for each group of corresponding initial sub-sequences, each dimension of which is calculated from one of the corresponding parameter values of the frames occurring in said group of corresponding initial sub-sequences.

27. A method of deriving an acoustic word representation as described in claim 26, wherein said receiving of a plurality of such frame sequences includes receiving on or more of such frame sequences for said given word from each of m speakers, where m is an integer larger than one.

28. A method of recognizing which word from among a plurality of words a given utterance corresponds to, said method comprising:

receiving a sequence of acoustic frames generated by the utterance of a given word, each of said frames having a corresponding set of n parameter values;

storing an alphabet of sound symbols, each of which has stored in association with it an n-dimensional probability distribution, with one dimension corresponding to each said n parameter values associated with said frames, wherein said alphabet of sound symbols is derived by clustering similar sounds in different words into a single sound symbol;

storing an acoustic spelling for each of said plurality of words, each of which spellings represents a sequence of one or more of said sound symbols, with a plurality of said sound symbols being used in the spelling of more than one word; and comparing the parameter values of said frame sequence against the sequence of corresponding probability distributions associated with said acoustic spelling for a given word to determine if the frame sequence corresponds to said word.

29. A speech recognition method as described in claim 28, further including training a speech recognition system to recognize words spoken by a given speaker, said training including:

receiving a sequence of training frames associated with a sequence of one or more training words having a known acoustic spelling;

dividing said training frame sequence into a plurality of sub-sequences of frames, with each of said sub-sequences of frames being associated with one of said sound symbols in said training words; and calculating one of said n dimensional probability distributions for a given sound symbol from the parameter values of the frames associated with that given sound symbols by said dividing of said training frame sequence into sub-sequences, and associating that probability distribution with that sound symbol in said alphabet of sound symbols.

30. A speech recognition method as described in claim 29, wherein said storing of an alphabet of sound symbols includes storing an initial n-dimensional probability distribution for each of a plurality of said sound symbols previous to said training by said given speaker; and said dividing of said training frame sequence includes time aligning said training frame sequence against the sequence of initial probability distributions associated with the acoustic spellings for said sequence of training words.

31. A speech recognition method as described in claim 30, wherein said time aligning of said training frame sequence against the sequence of corresponding initial probability distributions includes making said time alignment by means of dynamic programming.

32. A speech recognition method as described in claim 29, wherein said sequence of one or more training words includes substantially fewer words than are contained in said plurality of words for which spellings are stored.

33. A speech recognition method as described in claim 32, wherein the acoustic spelling of said sequence of one or more training words include all the sound symbols stored in said alphabet of sound symbols.

34. A speech recognition method as described in claim 28, wherein each of said sound symbols has only one of said n-dimensional probability distributions stored in association with it.

* * * * *